United States Patent
Takagi et al.

(10) Patent No.: US 11,365,568 B2
(45) Date of Patent: Jun. 21, 2022

(54) VEHICLE DOOR LOCK APPARATUS

(71) Applicant: ANSEI CORPORATION, Obu (JP)

(72) Inventors: Masaharu Takagi, Nagoya (JP); Satoshi Yamaji, Nagoya (JP)

(73) Assignee: ANSEI CORPORATION, Obu (JP)

( * ) Notice: Subject to any disclaimer, the term of this patent is extended or adjusted under 35 U.S.C. 154(b) by 775 days.

(21) Appl. No.: 16/296,717

(22) Filed: Mar. 8, 2019

(65) Prior Publication Data

US 2019/0390486 A1 Dec. 26, 2019

(30) Foreign Application Priority Data

Jun. 26, 2018 (JP) .............................. JP2018-120338

(51) Int. Cl.
*E05B 77/34* (2014.01)
*E05B 85/02* (2014.01)
(Continued)

(52) U.S. Cl.
CPC .............. *E05B 77/34* (2013.01); *E05B 79/02* (2013.01); *E05B 85/02* (2013.01); *B60J 5/00* (2013.01);
(Continued)

(58) Field of Classification Search
CPC .......... E05B 77/34; E05B 79/02; E05B 79/12; E05B 79/04; E05B 79/14; E05B 17/14; E05B 85/02; B60J 5/00; E05Y 2900/531
See application file for complete search history.

(56) References Cited

U.S. PATENT DOCUMENTS

| | | | |
|---|---|---|---|
| 2,634,147 | A | 4/1953 | Robertson |
| 2,806,727 | A | 9/1957 | Johnstone |

(Continued)

FOREIGN PATENT DOCUMENTS

| | | |
|---|---|---|
| CN | 1729341 A | 2/2006 |
| CN | 101748944 A | 6/2010 |

(Continued)

OTHER PUBLICATIONS

English machine translation of Decision to Grant drafted Oct. 29, 2019 in related JP application No. 2018-120338.

(Continued)

*Primary Examiner* — Kristina R Fulton
*Assistant Examiner* — James E Ignaczewski
(74) *Attorney, Agent, or Firm* — J-Tek Law PLLC; Jeffrey D. Tekanic; Scott T. Wakeman

(57) ABSTRACT

A vehicle door lock apparatus (1) includes latch and actuating housings (9, 7) that are fixed between outer and inner panels (3, 4) of a vehicle door (2). A connector fitting section (80C) is exposed through an open window (4H) in the inner panel (4) toward a vehicle interior side of the inner panel (4). A movable member (50) includes a second end (52) that projects out of the actuating housing (7), passes through an opening (80H) in the actuating housing (7) and also passes through the open window (4H) toward the vehicle interior side, where it is coupled to a link member (C3). The connector fitting section (80C) and the opening (80H) are covered by a single umbrella-shaped blocking member (89) that contacts the actuating housing (7) and the inner panel (4) around at least an upper side of the peripheral edge of the open window (4H).

20 Claims, 15 Drawing Sheets

(51) Int. Cl.
  *E05B 79/02* (2014.01)
  *B60J 5/00* (2006.01)
  *E05B 79/12* (2014.01)
(52) U.S. Cl.
  CPC ......... *E05B 79/12* (2013.01); *E05Y 2900/531* (2013.01)

(56) References Cited

U.S. PATENT DOCUMENTS

| | | |
|---|---|---|
| 2,934,930 A | 5/1960 | Garvey |
| 2,977,785 A | 4/1961 | Beckman |
| 2,996,327 A | 8/1961 | France et al. |
| 3,334,934 A | 8/1967 | Bela |
| 3,359,767 A | 12/1967 | Alfonsas et al. |
| 3,400,962 A | 9/1968 | Martens |
| 3,596,482 A | 8/1971 | Pollak |
| 3,848,909 A | 11/1974 | Foley |
| 4,382,622 A | 5/1983 | Ishikawa |
| 4,440,006 A | 4/1984 | Kleefeldt |
| 4,783,102 A | 11/1988 | Bernard |
| 4,948,184 A | 8/1990 | Weyerstall et al. |
| 5,603,539 A | 2/1997 | Gruhn et al. |
| 5,733,046 A | 3/1998 | Bellmore et al. |
| 5,802,894 A | 9/1998 | Jahrsetz et al. |
| 5,971,448 A | 10/1999 | Hayakawa et al. |
| 6,264,253 B1 | 7/2001 | Takaishi |
| 6,416,088 B1 | 7/2002 | Graute |
| 6,419,286 B1 | 7/2002 | Szablewski |
| 6,601,885 B1 | 8/2003 | Mu |
| 7,478,846 B2 | 1/2009 | Yoshikuwa et al. |
| 7,568,741 B2 | 8/2009 | Odahara |
| 7,621,571 B2 | 11/2009 | Umino |
| 7,762,594 B2 | 7/2010 | Arabia, Jr. et al. |
| 7,815,231 B2 | 10/2010 | Suzumura et al. |
| 7,827,836 B2 | 11/2010 | Cetnar |
| 8,240,723 B2 | 8/2012 | Akahori et al. |
| 8,376,417 B2 | 2/2013 | Machida et al. |
| 8,438,888 B2 | 5/2013 | Akizuki et al. |
| 8,678,452 B2 | 3/2014 | Nagaoka et al. |
| 8,726,705 B2 | 5/2014 | Tabe et al. |
| 8,789,861 B2 | 7/2014 | Takayanagi et al. |
| 8,814,228 B2 | 8/2014 | Fujiwara et al. |
| 8,827,328 B2 | 9/2014 | Akizuki et al. |
| 9,631,404 B2 | 4/2017 | Takagi et al. |
| 9,708,837 B2 | 7/2017 | Bendel et al. |
| 10,047,548 B2 | 8/2018 | Zeabari |
| 10,094,149 B2 | 10/2018 | Mittelbach |
| 10,273,724 B2 | 4/2019 | Kamagata et al. |
| 10,526,823 B2 * | 1/2020 | Nagata ................ B60J 5/00 |
| 10,597,908 B2 * | 3/2020 | Taga ................ E05B 79/20 |
| 2001/0015558 A1 | 8/2001 | Fisher et al. |
| 2003/0107235 A1 | 6/2003 | Komatsu et al. |
| 2003/0218340 A1 | 11/2003 | Coleman et al. |
| 2004/0178659 A1 | 9/2004 | Komatsu et al. |
| 2004/0227357 A1 | 11/2004 | Ishihara et al. |
| 2004/0251712 A1 | 12/2004 | Obara |
| 2005/0140149 A1* | 6/2005 | Umino ................ E05B 79/20 |
| | | 292/216 |
| 2005/0218661 A1 | 10/2005 | Brose et al. |
| 2006/0006671 A1 | 1/2006 | Noel et al. |
| 2006/0028029 A1 | 2/2006 | Spurr |
| 2006/0087129 A1 | 4/2006 | Gotou et al. |
| 2006/0157989 A1 | 7/2006 | Graute |
| 2006/0214467 A1 | 9/2006 | Usuzaki et al. |
| 2008/0078215 A1 | 4/2008 | Odahara |
| 2008/0203737 A1 | 8/2008 | Tomaszewski et al. |
| 2009/0212577 A1 | 8/2009 | Fukunaga et al. |
| 2010/0084888 A1 | 4/2010 | Ishitobi et al. |
| 2010/0109350 A1 | 5/2010 | Gschweng et al. |
| 2010/0194120 A1 | 8/2010 | Kaiser et al. |
| 2010/0207401 A1 | 8/2010 | Taga |
| 2010/0327609 A1 | 12/2010 | Akizuki et al. |
| 2011/0179835 A1 | 7/2011 | Tabe et al. |
| 2012/0000258 A1 | 1/2012 | Akizuki et al. |
| 2012/0056437 A1 | 3/2012 | Takayanagi et al. |
| 2012/0068479 A1 | 3/2012 | Bendel et al. |
| 2012/0118029 A1 | 5/2012 | Akizuki et al. |
| 2013/0015673 A1 | 1/2013 | Akizuki et al. |
| 2013/0049379 A1 | 2/2013 | Yokota et al. |
| 2013/0328325 A1 | 12/2013 | Uehara et al. |
| 2014/0346786 A1 | 11/2014 | Takagi et al. |
| 2014/0361555 A1 | 12/2014 | Bendel et al. |
| 2015/0048632 A1 | 2/2015 | Menke |
| 2015/0191945 A1 | 7/2015 | Yamaguchi et al. |
| 2015/0259952 A1 | 9/2015 | Barmscheidt |
| 2015/0267441 A1 | 9/2015 | Fuchs et al. |
| 2015/0361694 A1 | 12/2015 | Zeabari |
| 2016/0017645 A1 | 1/2016 | Tomaszewski et al. |
| 2016/0115718 A1 | 4/2016 | Lee et al. |
| 2016/0177599 A1 | 6/2016 | Nozawa et al. |
| 2016/0208523 A1 | 7/2016 | Single et al. |
| 2016/0273248 A1 | 9/2016 | Mittelbach |
| 2016/0281395 A1 | 9/2016 | Scholz et al. |
| 2017/0159334 A1 | 6/2017 | Ishiguro |
| 2017/0204639 A1* | 7/2017 | Akahori ................ E05B 81/54 |
| 2017/0234039 A1 | 8/2017 | Taga |
| 2018/0016820 A1* | 1/2018 | Takagi ................ E05B 81/06 |
| 2018/0023325 A1* | 1/2018 | Takagi ................ E05B 81/16 |
| | | 292/259 A |
| 2018/0023327 A1* | 1/2018 | Takagi ................ E05B 79/22 |
| | | 292/216 |
| 2018/0073282 A1 | 3/2018 | Takagi et al. |
| 2018/0080262 A1* | 3/2018 | Takagi ................ E05B 85/02 |
| 2018/0148956 A1* | 5/2018 | Takagi ................ E05B 79/12 |

FOREIGN PATENT DOCUMENTS

| | | |
|---|---|---|
| CN | 101812947 A | 8/2010 |
| CN | 101812948 A | 8/2010 |
| CN | 102362041 A | 2/2012 |
| CN | 103195310 A | 7/2013 |
| CN | 203239056 U | 10/2013 |
| CN | 103403283 A | 11/2013 |
| CN | 203294205 U | 11/2013 |
| CN | 103597155 A | 2/2014 |
| CN | 104114792 A | 10/2014 |
| CN | 105525808 A | 4/2016 |
| CN | 105545126 A | 5/2016 |
| CN | 105593445 A | 5/2016 |
| CN | 107620529 A | 1/2018 |
| DE | 102005059833 A1 | 8/2006 |
| DE | 102008015627 A1 | 10/2009 |
| EP | 0894923 A1 | 2/1999 |
| EP | 2881529 A1 | 6/2015 |
| EP | 2754799 B1 | 3/2017 |
| EP | 3219888 A1 | 9/2017 |
| GB | 2396656 A | 6/2004 |
| GB | 2477612 A | 8/2011 |
| JP | S55162666 U | 11/1980 |
| JP | S5944477 A | 3/1984 |
| JP | S61163866 U | 10/1986 |
| JP | H0617960 | 5/1994 |
| JP | 2002129806 A | 5/2002 |
| JP | 4163490 A | 6/2004 |
| JP | 2004156330 A | 6/2004 |
| JP | 2005188130 A | 7/2005 |
| JP | 2008088708 A | 4/2008 |
| JP | 2011026826 A | 2/2011 |
| JP | 2011153431 A | 8/2011 |
| JP | 2011226194 A | 11/2011 |
| JP | 5030908 B2 | 9/2012 |
| JP | 2012180702 A | 9/2012 |
| JP | 2013083086 A | 5/2013 |
| JP | 2013096144 A | 5/2013 |
| JP | 2013117115 A | 6/2013 |
| JP | 2014015717 A | 1/2014 |
| JP | 2014043769 A | 3/2014 |
| JP | 2015096683 A | 5/2015 |
| JP | 2015209641 A | 11/2015 |
| JP | 2016056550 A | 4/2016 |
| JP | 2016098589 A | 5/2016 |
| JP | 5930273 B2 | 6/2016 |
| JP | 2018012939 A | 1/2018 |
| JP | 2018012940 A | 1/2018 |

(56) References Cited

FOREIGN PATENT DOCUMENTS

| JP | 2018031256 A | | 3/2018 | |
|----|---|---|---|---|
| JP | 2018031256 A | * | 3/2018 | |
| KR | 100694448 B1 | | 3/2007 | |
| WO | WO-2015136775 A1 | * | 9/2015 | ............ E05B 79/10 |

OTHER PUBLICATIONS

English machine translation of Search Report drafted Sep. 26, 2021 in related CN application No. 2019101923806.

Office Action from the Japanese Patent Office dated Nov. 5, 2019 in related Japanese application No. 2016-140590, and machine translation thereof.

Office Action from the Japanese Patent Office dated Nov. 5, 2019 in related Japanese application No. 2016-183897, and machine translation thereof.

Office Action and Search Report from the Taiwanese Patent Office dated Jul. 30, 2020 in related application No. 106131946, and translation thereof.

Machine translation of Search Report from the Japanese Patent Office dated Feb. 18, 2020 in related Japanese application No. 2016-223076.

Office Action from the Japanese Patent Office dated Feb. 25, 2020 in related Japanese application No. 2016-223076, and machine translation thereof.

* cited by examiner

VEHICLE DOOR LOCK APPARATUS

CROSS-REFERENCE

This application claims the priority benefit of Japanese Patent Application No. 2018-120338 filed on Jun. 26, 2018, the entire contents of which are incorporated by reference as if fully set forth herein.

TECHNICAL FIELD

The present invention relates to a vehicle door lock apparatus.

BACKGROUND ART

An example of a known vehicle door lock apparatus is disclosed in US 2005/0140149.

This known vehicle door lock apparatus includes a main casing and sub casing forming a housing, a latch mechanism and a lock mechanism (actuating mechanisms), electronic components, and a plurality of connection terminals.

As can be seen in FIG. 3 of US 2005/0140149, a connector fitting (mating) section, in (to) which an external connector is fit (mated), is formed on the housing. The housing is fixed to a vehicle door.

The actuating mechanisms are housed inside the housing, as can be seen in FIG. 1 of US 2005/0140149. The actuating mechanisms perform the function of setting the vehicle door to an unlocked state or a locked state. Components of the actuating mechanism include an inside (I/S) lock lever. The I/S lock lever is displaceable between a position corresponding to the unlocked state and a position corresponding to the locked state. The I/S lock lever is coupled to an inside lock button (interior door lock knob) by a wire cable, as can be seen in FIG. 3 of US 2005/0140149.

The electronic components are housed in the housing and are associated with the actuating mechanism. Specifically, the electronic components are an electric driving motor that operates components of the actuating mechanisms and a switch that detects positions of the components of the actuating mechanism, as can be seen in FIGS. 8-10 of US 2005/0140149.

Connection terminals are connected to the electric driving motor and the switch and respectively have projecting ends. The projecting ends of the connection terminals project from the connector fitting section. The external connector is connectable to the projecting ends.

A lock lever is connected to the wire cable that is connected to the inside door button, as can be seen in FIG. 3 of US 2005/0140149. The lock lever is disposed on the vehicle interior side of the housing at a position displaced from the connector fitting (mating) section having the connecting terminals, such that two separate holes in the housing are required for the lock lever and the connector fitting (mating) section.

SUMMARY OF THE INVENTION

It is an object of the present teachings to disclose a vehicle door lock apparatus that can simplify the assembly process by providing a more rational design and/or that can provide improved blocking/shielding properties (protection).

In one aspect of the present teachings, a vehicle door lock apparatus may include:

a housing fixed (or fixable) to a vehicle door and having a connector fitting section (connector mating part) configured to mate with an external connector;

an actuating mechanism disposed in the housing and configured to lock and unlock the vehicle door;

at least one electronic component disposed in the housing and associated with (operably coupled to) the actuating mechanism;

a plurality of connection terminals electrically connected to the at least one electric component, the connection terminals respectively having projecting ends that project from the connector fitting section and mate (for mating) with the external connector; and a movable member coupled to the actuating mechanism and displaceable from a first position corresponding to an unlocked state of the actuating mechanism to a second position corresponding to a locked state of the actuating mechanism, and vice versa, wherein:

the vehicle door includes an outer panel, an inner panel disposed on a vehicle interior side of the outer panel and affixed to the outer panel, and a door trim disposed on the vehicle interior side of the inner panel and affixed to the inner panel, the housing is affixed to the vehicle door between the outer panel and the inner panel, an open window is defined in the inner panel, the connector fitting section being disposed in the open window such that the connection terminals face towards the vehicle interior side, a link member is disposed on the vehicle interior side of the inner panel, the movable member includes a first end operably coupled to the actuating mechanism in the housing and a second end integral with the first end, the link member being operably coupled to the second end, the second end of the movable member projects out of the housing through an opening formed in the housing and also extends through the open window (i.e. the same open window that receives/holds the connector fitting section), and a single blocking member having a substantially umbrella shape (or substantially inverted U-shape) is disposed between and in contact with the housing and the inner panel around at least an upper portion of a peripheral edge of the open window, the single blocking member covering at least an upper side of the connector fitting section and the opening formed in the housing.

In such a vehicle door lock apparatus according to the present teachings, the single open window provides an open path for both the connector fitting section (connector mating part) and the opening formed in the housing to be exposed through the inner panel towards the vehicle interior. Therefore, it is not necessary to provide separate open windows for the connector fitting section and for the second end of the movable member.

Consequently, when assembling the vehicle door lock apparatus, it is possible to easily fit (mate) the external connector in (with) the connector fitting section via the single open window and couple the link member to the second end of the movable member.

The design of the above-described vehicle door lock apparatus reliably blocks/shields foreign matter from entering into the housing of the vehicle door lock apparatus or into the interior space between the inner panel and the door trim via the single open window, because the single blocking member contacts (is disposed between) the housing and the inner panel around at least an upper side (and preferably also front and rear sides) of the peripheral edge of the single open window.

Therefore, such a vehicle door lock apparatus enables the assembly process to be simplified. In addition or in the alternative, if a thin tool (e.g., a so-called "slim jim" or lockout tool) is inserted through a gap between the outer panel of the vehicle door and the door window with the intention of manipulating the second end of the movable member (i.e. to unlock the vehicle door with the intention of stealing the vehicle), the blocking member will block the path between the housing and the inner panel so that the thin tool is prevented from reaching the movable member through the open window. Therefore, improved anti-theft properties (protection) can be realized.

In addition or in the alternative, when service or maintenance of the vehicle door lock apparatus becomes necessary, the door trim may be removed and the link member coupled to the second end of the movable member can be easily detached on the vehicle interior side of the vehicle door. Therefore, service/maintenance work on the door lock apparatus can be facilitated.

A peripheral wall may be formed on the housing so as to project through the inner panel (in the assembled state of the door lock apparatus) and also surround the connector fitting section and the opening formed in the housing for the second end of the movable member to project out of the housing. The peripheral wall is preferably disposed in the open window. In this case, the peripheral wall can serve as a guide for aligning the connector fitting section and the opening with (in) the open window.

If the blocking member is disposed along (at least partially around) the peripheral wall, deviation of the blocking member from its ideal position can be prevented, thereby further simplifying the assembly process.

Furthermore, the peripheral wall also will block the above-described thin tool when it is inserted into the interior of the vehicle door with the intention of manipulating the second end of the movable member, thereby further improving the anti-theft properties (protection) of the vehicle door lock apparatus.

The peripheral wall and the open window are preferably circular. In this case, further simplification of the assembly process can be realized because the peripheral wall is easily disposed (inserted) in the open window.

The blocking member is preferably attached to (mounted on) the housing and formed of a foam body having a blocking or shielding function. In this case, when the housing is being affixed to the vehicle door, the blocking member comes into contact with the inner panel and is compressively deformed. Therefore, the blocking member contacts the housing and the inner panel without a gap, thereby providing a seal between the housing and the inner panel that reliably blocks foreign matter (e.g., water, dust, etc.) from passing from the interior space between the inner panel and the outer panel via the open window to the interior space between the inner panel and the door trim. Further simplification of the assembly process can be realized because labor and time for attaching the blocking member can be saved owing to the fact that the blocking member is pre-assembled with the housing prior to the vehicle door lock apparatus being installed in the vehicle door.

The movable member preferably includes a transmission shaft between the first end and the second end and the transmission shaft passes through the opening formed in the housing. The transmission shaft is rotatable about a rotational axis that extends at least substantially in parallel to a thickness (depth) direction of the inner panel. At least an upper side of the transmission shaft is preferably covered by the blocking member (in the up-down direction of the vehicle door). In this case, the open window can be reduced in size because the opening, through which the transmission shaft passes, can be reduced in size. Furthermore, foreign matter can be reliably prevented (blocked) by the blocking member from reaching a (small) gap between the opening in the housing and the transmission shaft.

The second end preferably includes at least one locking piece that is elastically deformable to detachably lock the link member on (to) the second end of the movable member. In this case, by elastically deforming the locking piece (radially inward), the work required to couple the link member to the second end of the movable member and/or to detach the link member from the second end can be easily carried out.

According to the present teachings, simplification of the assembly process of a vehicle door lock apparatus and/or improved blocking/shielding properties (protection) can be achieved.

DETAILED DESCRIPTION OF PREFERRED EMBODIMENTS

Representative, non-limiting Embodiments 1 to 4 of the present teachings are explained below with reference to the drawings.

Embodiment 1

Figure 1:
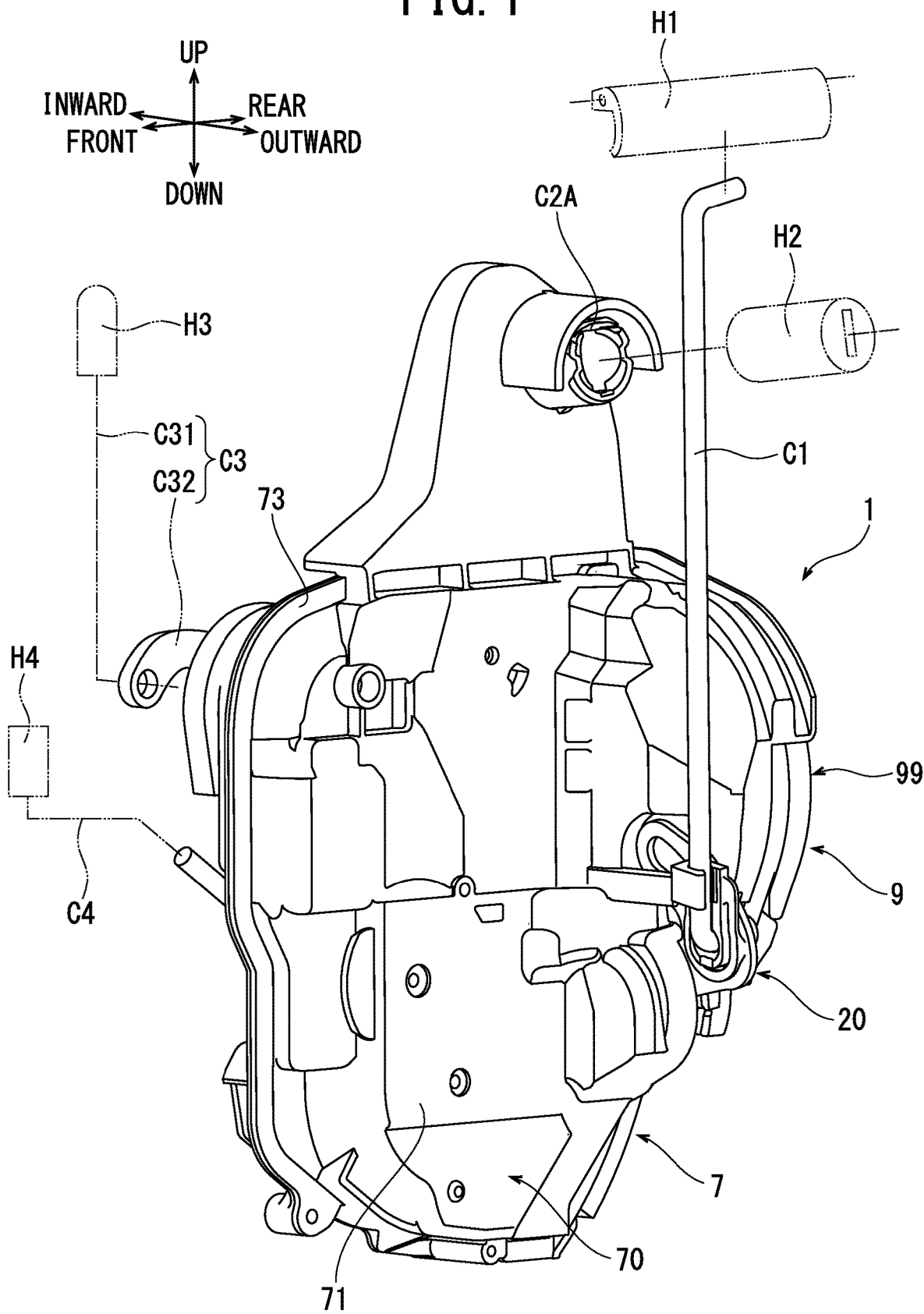
FIG. 1 is a perspective view of a vehicle door lock apparatus according to Embodiment 1 of the present teachings.
Figure 2:
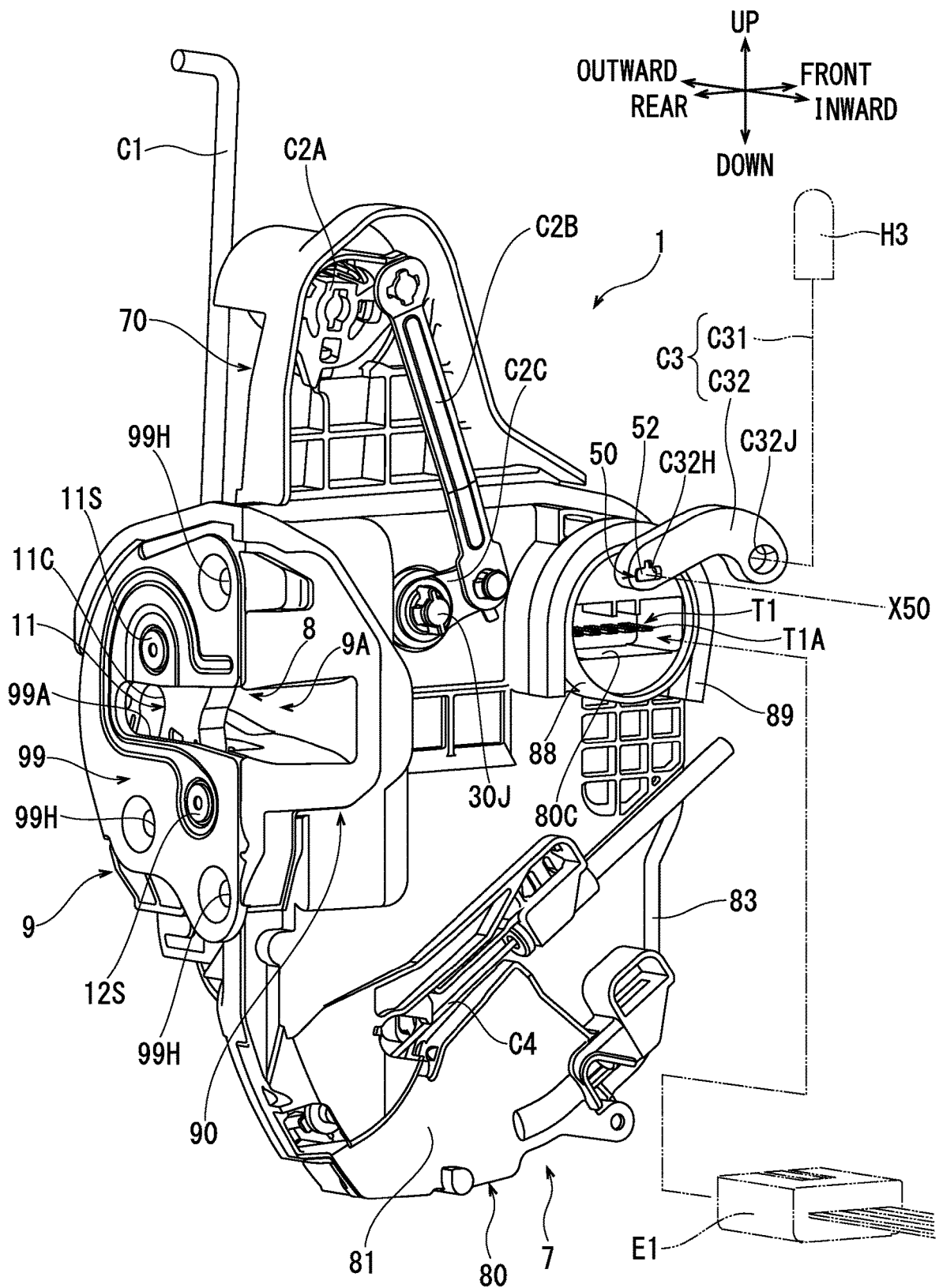
FIG. 2 is a different perspective view of the vehicle door lock apparatus according to Embodiment 1.
Figure 3:
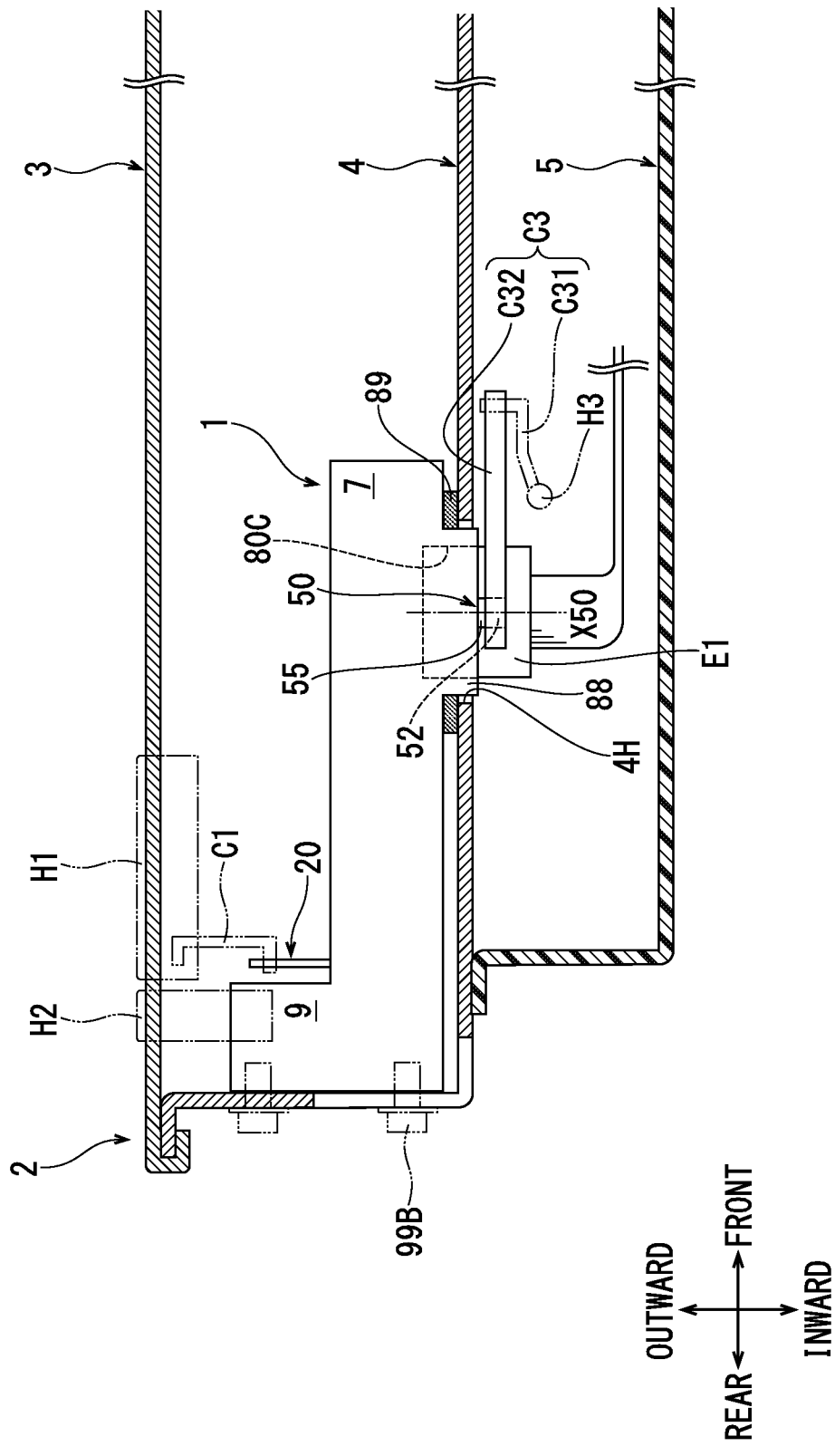
FIG. 3 is a schematic top view showing the relative positions of the vehicle door lock apparatus according to Embodiment 1 with regard to an outer panel, an inner panel, and a door trim of a vehicle door.

FIGS. 1 and 2 show a vehicle door lock apparatus 1 (hereinafter simply referred to as "door lock apparatus 1") according to a first representative, non-limiting example (Embodiment 1) of the present teachings. As shown in FIG. 3, the door lock apparatus 1 is fixed to a vehicle door 2 (hereinafter simply referred to as "door 2") that is openable and closable with respect to a vehicle frame (chassis) of a vehicle such as an automobile, a bus, or a commercial vehicle. By retaining (latching or holding) a striker that is affixed to the vehicle frame, the door lock apparatus 1 is capable of retaining (holding) the door 2 closed with respect to the vehicle frame.

In FIGS. 1 to 3, the door lock apparatus 1 is disposed on the inside (in the interior) at the rear end of the door 2 that is provided on the left side surface of the vehicle frame. It is noted that, when another door lock apparatus 1 is disposed on the inside (in the interior) at the rear end of the door 2 that is provided on the right side surface of the vehicle frame, the two door lock apparatus 1 will be disposed in a mirror image state. In addition or in the alternative, a door lock apparatus 1 according to the present teachings can be provided in (on) a back door, tail gate or another portion of the vehicle.

The front-rear direction shown in FIGS. 1 to 3 is based on the front-rear direction of the vehicle. The up-down direction shown in FIGS. 1 and 2 is based on the up-down direction of the vehicle. Further, the vehicle inward-outward direction shown in FIGS. 1 to 3 is based on an occupant sitting in the interior (cabin) of the vehicle. The left surface side of the vehicle is indicated as the vehicle outer side. The opposite side of the vehicle outer side is indicated as the vehicle inner side, that is, the vehicle interior side. The front-rear direction, the up-down direction, and the vehicle inward-outward direction shown in FIG. 4 and the subsequent figures are displayed in a corresponding manner to FIGS. 1 to 3.

As shown in FIG. 3, the door 2 includes an outer panel 3, an inner panel 4, and a door trim 5. In Embodiment 1, the outer panel 3 and the inner panel 4 may be, e.g., press worked products made from steel plate. The door trim 5 is or includes, e.g., a resin molded product.

The outer panel 3 constitutes a part of the exterior surface of the vehicle. The inner panel 4 is disposed towards the vehicle interior side relative to the outer panel 3. The peripheral edge section of the inner panel 4 is welded to the peripheral edge section of the outer panel 3; furthermore, the peripheral edge section of the outer panel 3 and the peripheral edge section of the inner panel 4 are hemmed. In this manner, the inner panel 4 is affixed to the outer panel 3.

The door trim 5 is disposed on the vehicle interior side of the inner panel 4 and is affixed to the inner panel 4 by not-shown fasteners such as clips or other types of fasteners. The door trim 5 constitutes a part of an ornamental design surface of the vehicle interior.

As shown in FIG. 1, an exterior door handle H1, a key cylinder H2, an interior door lock knob H3, and an interior door handle H4 are provided in and/or on the door 2.

As shown in FIG. 3, the exterior door handle H1 is pivotably supported by the outer panel 3 and located on the exterior surface of the vehicle. The key cylinder H2 is attached to the outer panel 3 so as to be partially exposed to the exterior of the vehicle.

Figure 4:
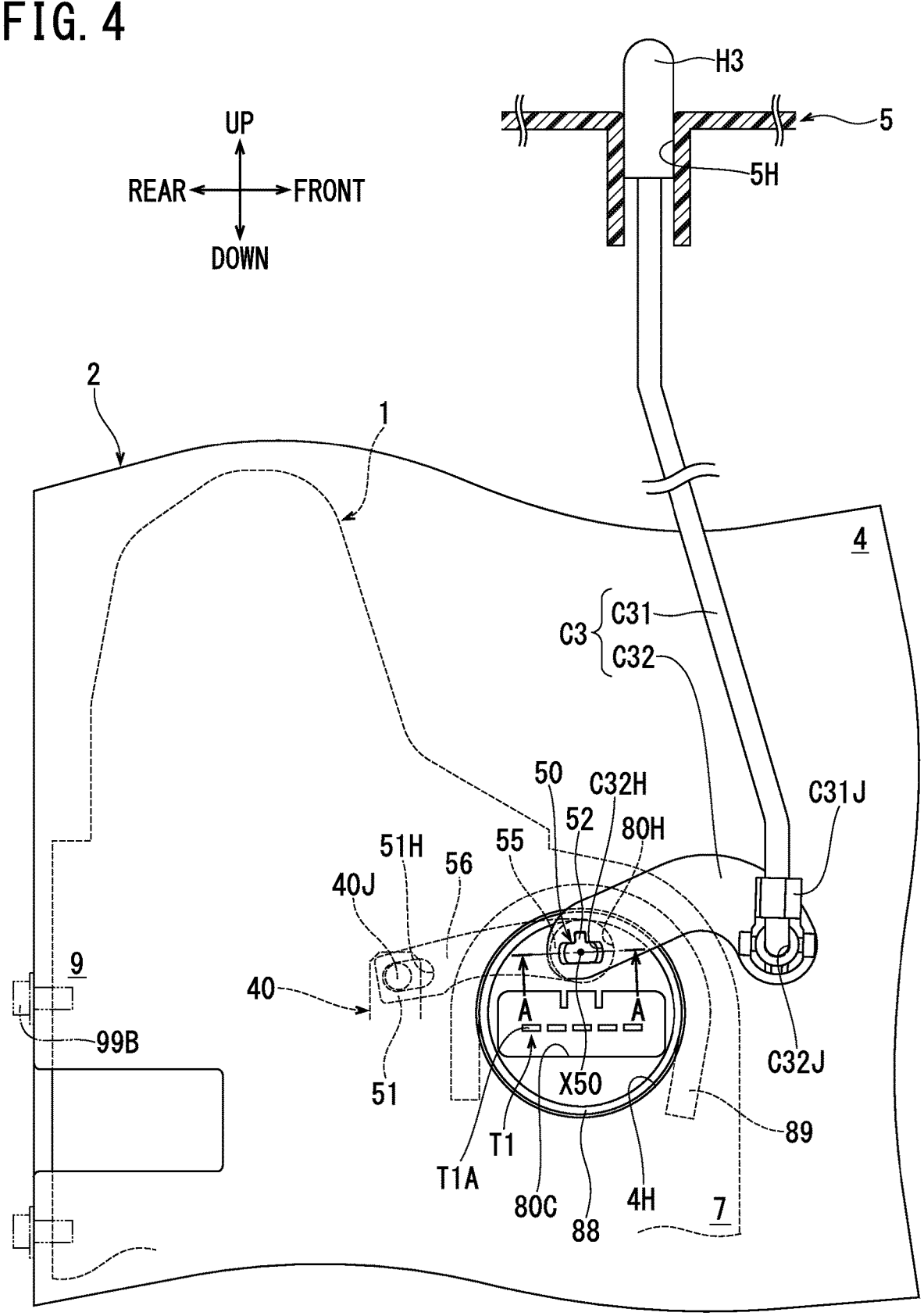
FIG. 4 is a schematic partial side view showing the relative positions of the vehicle door lock apparatus according to Embodiment 1 and the inner panel, a link member, and an interior door lock knob in the locked state of the vehicle door lock apparatus.
Figure 5:
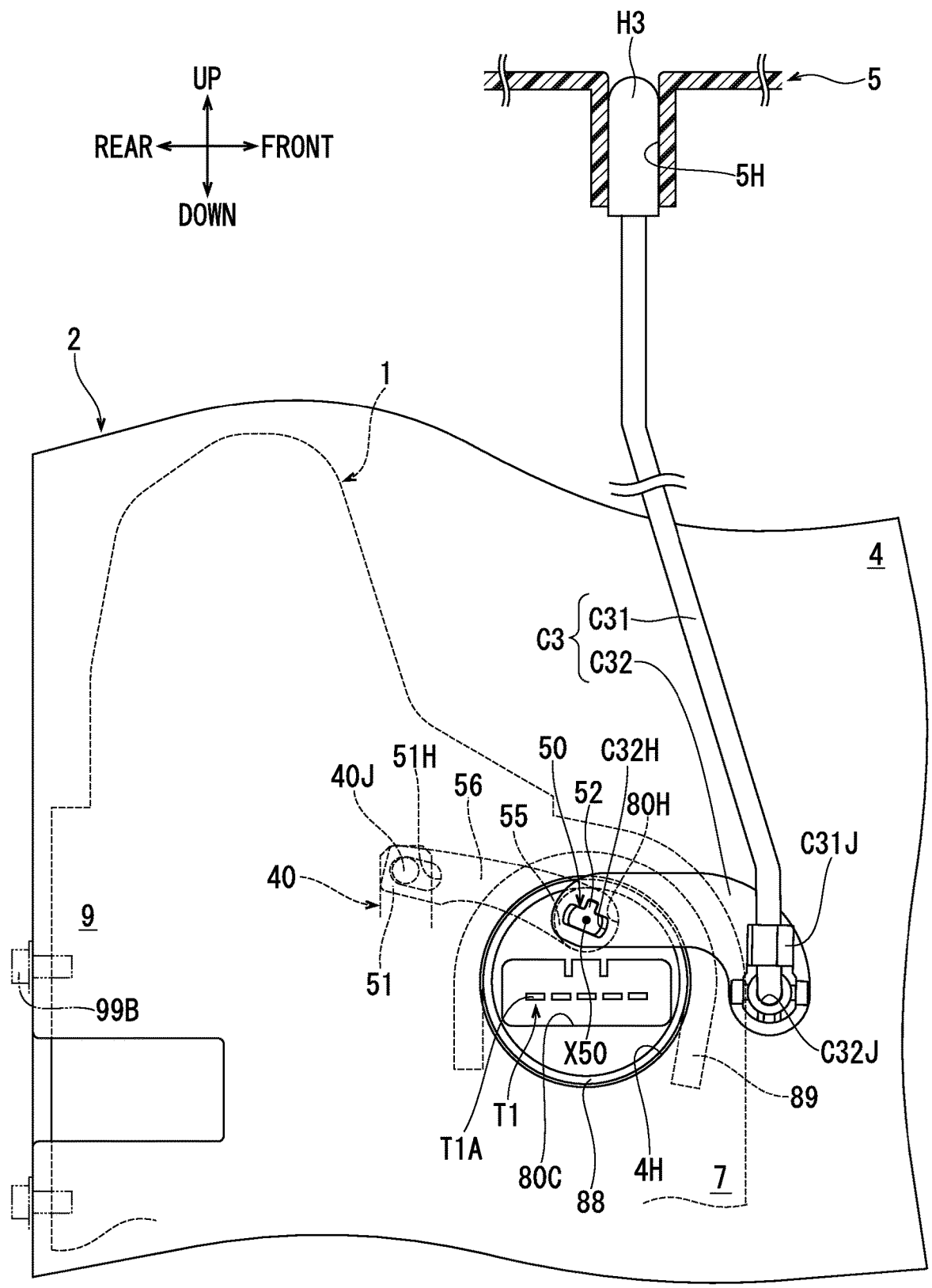
FIG. 5 is another schematic partial side view showing the relative positions of the vehicle door lock apparatus according to Embodiment 1 and the inner panel, the link member, and the interior door lock knob in the unlocked state of the vehicle door lock apparatus.

As shown in FIGS. 4 and 5, the interior door lock knob H3 is retained in a guide hole 5H formed in the upper end (side) of the door trim 5 and is movable in the up-down direction. As shown in FIG. 4, when the interior door lock knob H3 is displaced (moved) upward, it projects from (above) the guide hole 5H and is exposed on the vehicle interior side of the door 2, thereby indicating that the door 2 is in the unlocked state. As shown in FIG. 5, when the interior door lock knob H3 is displaced (moved) downward, it is completely submerged in the guide hole 5H, thereby indicating that the door 2 is in the locked state. An occupant of the vehicle can lock the door 2 by performing a locking operation, i.e. by pushing the interior door lock knob H3 from the position shown in FIG. 4 down to the position shown in FIG. 5.

Although not shown in the figures, the interior door handle H4 is pivotably supported by the inner panel 4 and the door trim 5 and is located on the vehicle interior side of the door 2.

As shown in FIG. 1, the upper end of a transmission rod C1 is coupled to the exterior door handle H1. The door lock apparatus 1 is disposed below the exterior door handle H1 on the inside (in the interior) of the door 2. The lower end of the transmission rod C1 is coupled to an outside (O/S) open lever 20 of the door lock apparatus 1.

The key cylinder H2 is retained by a key-cylinder retainer C2A, which is rotatably (turnably) provided at the upper end of the door lock apparatus 1, so that the key cylinder H2 rotates together with key-cylinder retainer C2A. As shown in FIG. 2, the upper end of a link rod C2B is coupled to the key-cylinder retainer C2A. The lower end of the link rod C2B is connected to an outside (O/S) lock lever 30 of the door lock apparatus 1 via a link lever C2C.

As shown in FIGS. 3 to 5, a link member C3 is coupled to the interior door lock knob H3. More specifically, the link member C3 includes a link rod C31 and a link lever C32. The link rod C31 is a bar-like body (rod) extending in the up-down direction. The interior door lock knob H3 is fixed to the upper end of the link rod C31. A coupling hole C32J penetrates through one end of the link lever C32 in the vehicle inward-outward direction. A shaft hole C32H penetrates through the other end of the link lever C32 in the vehicle inward-outward direction.

The lower end of the link rod C31 is inserted through a coupling supporting member C31J made of resin (shown in FIGS. 4 and 5) and then through the coupling hole C32J of the link lever C32. Consequently, the link member C3 constitutes a subassembly in which the link rod C31 and the link lever C32 are coupled.

As shown in FIGS. 3 to 5, the link member C3 is disposed on the vehicle interior (inward) side of the inner panel 4. More specifically, the link rod C31 extends downward from the interior door lock knob H3 in the interior space between the inner panel 4 and the door trim 5. The shaft hole C32H of the link lever C32 is coupled to a second end 52 of a movable member 50 of the door lock apparatus 1, which will be further discussed below.

As shown in FIG. 1, a first end of a transmission cable C4 is connected to the interior door handle H4. A second end of the transmission cable C4 is drawn into the door lock apparatus 1 and connected to an inside (I/S) open lever 25 as shown, e.g., in FIG. 7.

Figure 6:
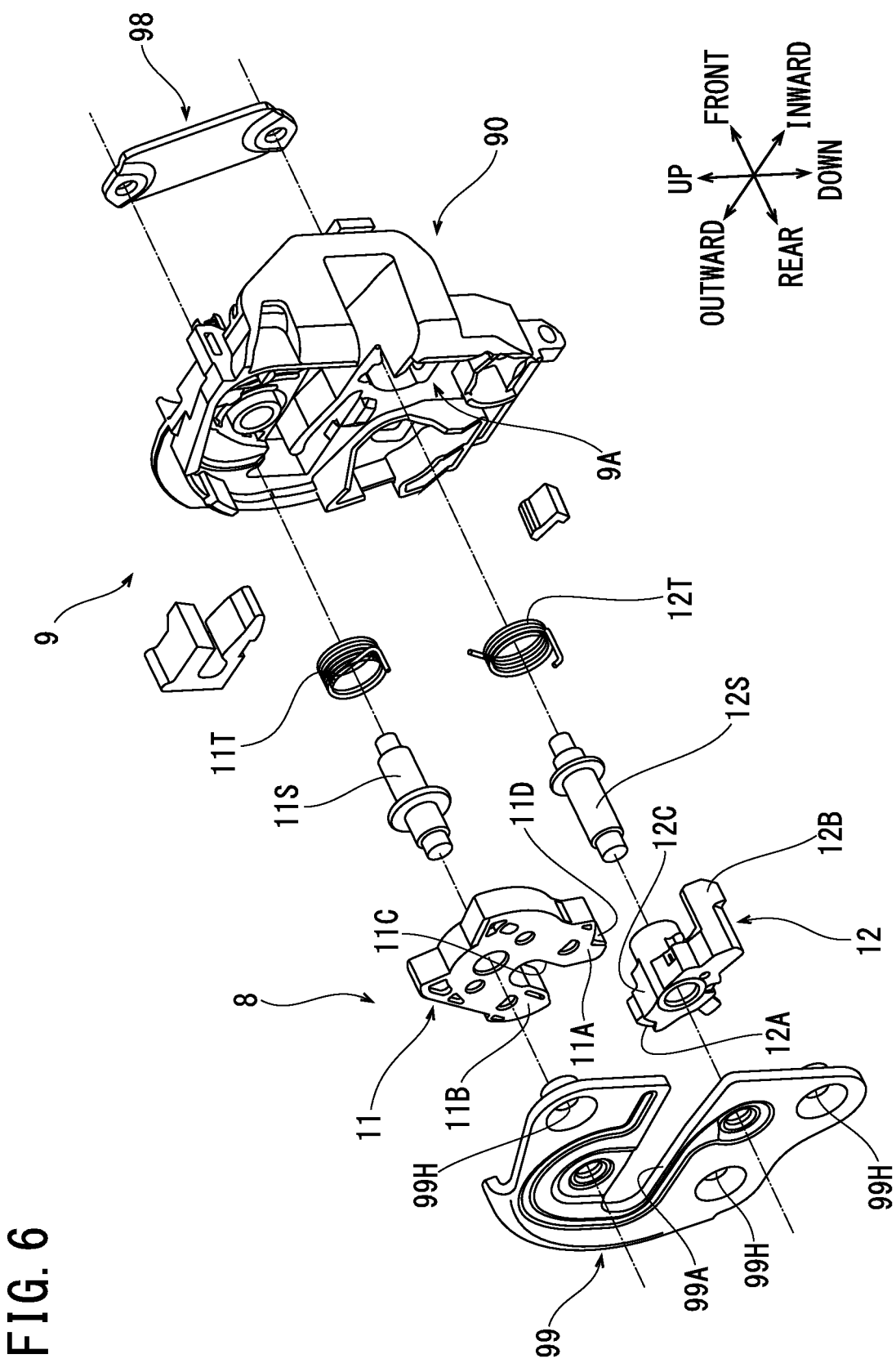
FIG. 6 is an exploded perspective view of a latch housing, a latch mechanism, etc. of Embodiment 1.

The door lock apparatus 1 includes a latch housing 9 as shown, e.g., in FIGS. 1, 2, and 6 and an actuating housing 7 as shown, e.g., in FIGS. 1, 2, 7 to 9, and 11. As shown in FIGS. 1 and 2, the actuating housing 7 is assembled (joined) to (mounted on) the latch housing 9. The latch housing 9 and the actuating housing 7 are representative, non-limiting examples of a "housing" according to the present teachings. The door lock apparatus 1 includes a lock mechanism 6 as shown, e.g., in FIGS. 7, 8, and 11 and a latch mechanism 8 as shown, e.g., in FIGS. 2 and 6. The lock mechanism 6 and the latch mechanism 8 are representative, non-limiting examples of an "actuating mechanism" according to the present teachings.

Figure 7:
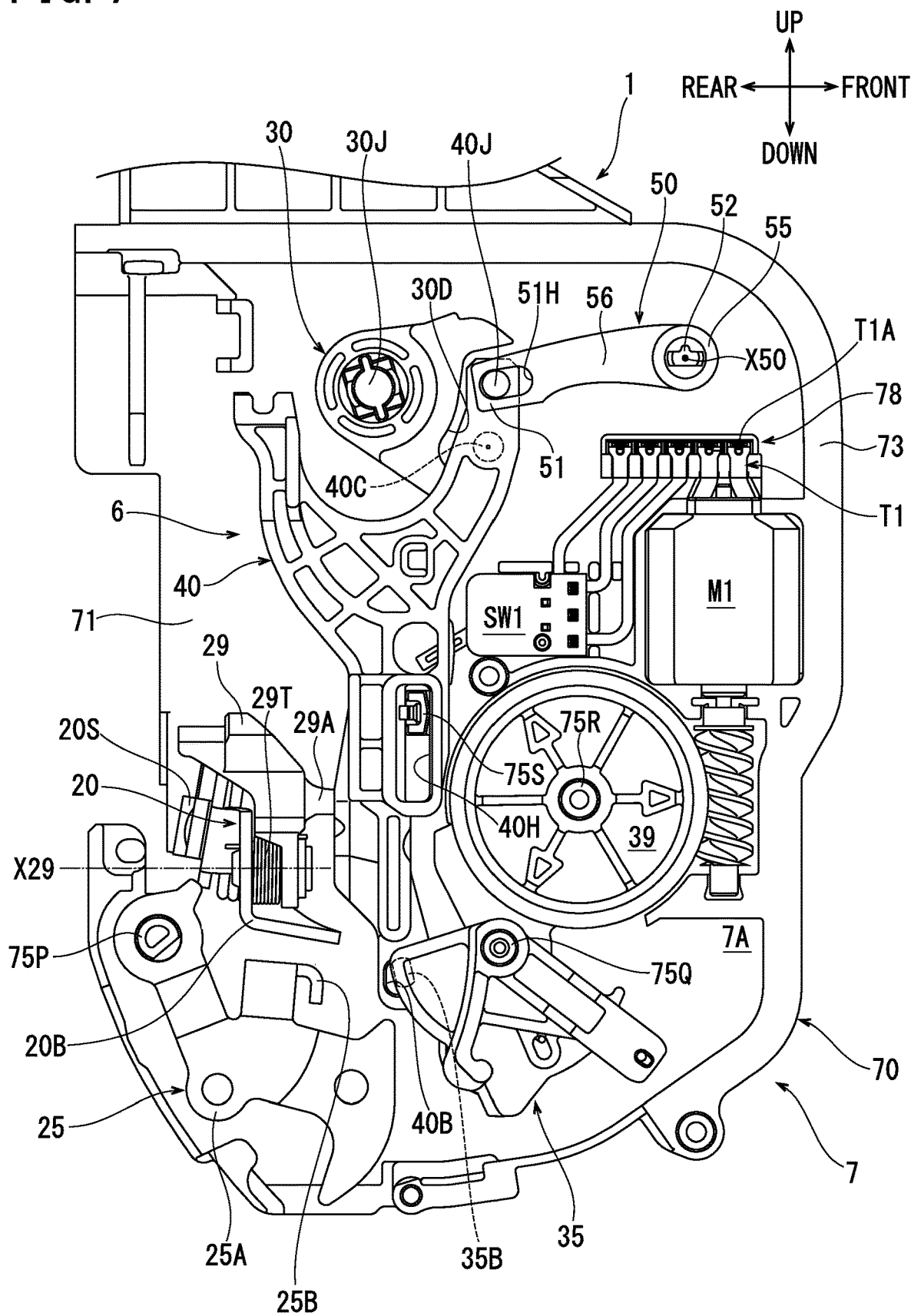
FIG. 7 is a side view of a first housing, a lock mechanism, etc. of Embodiment 1.
Figure 8:
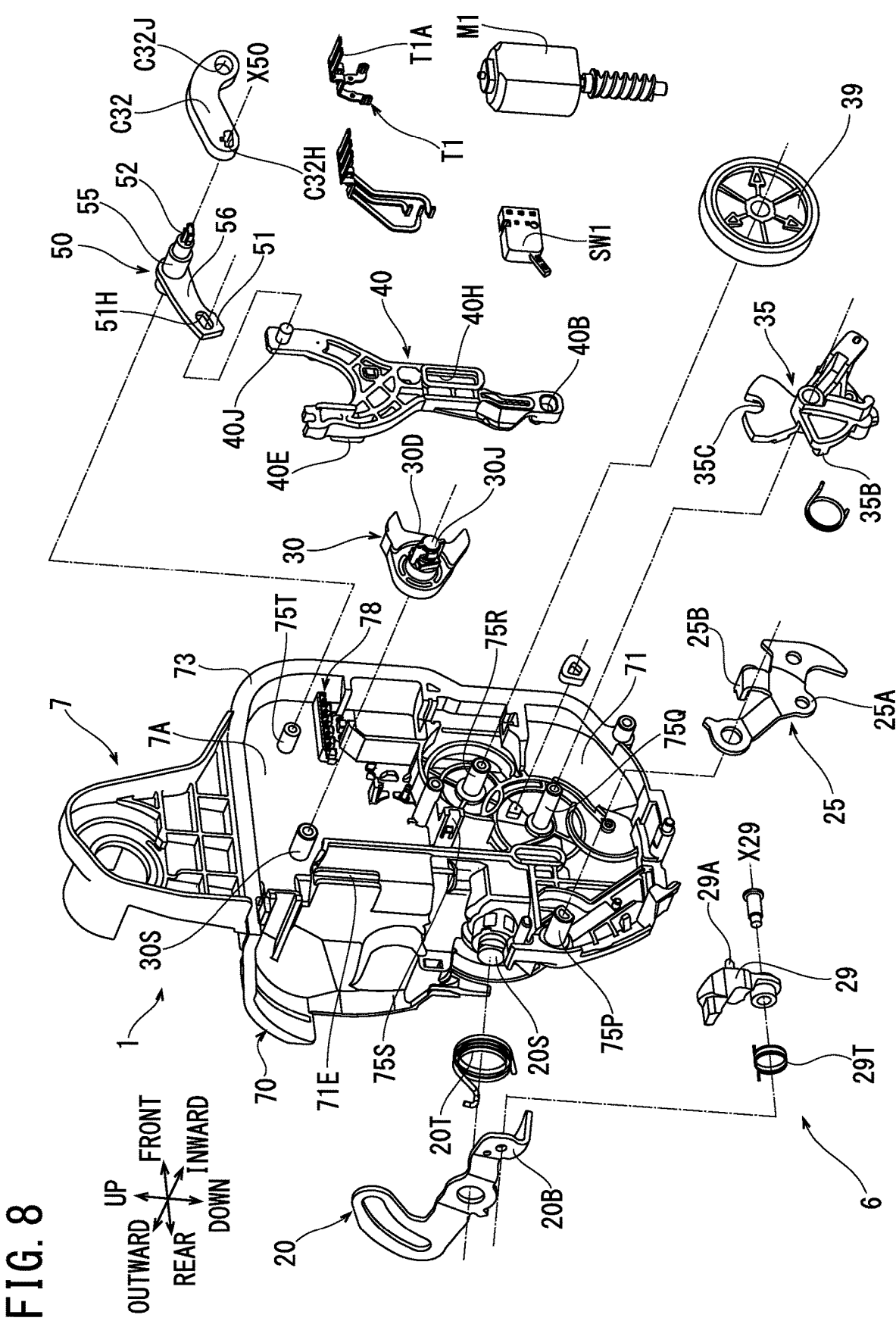
FIG. 8 is an exploded perspective view of the first housing, the lock mechanism, etc. of Embodiment 1.
Figure 9:
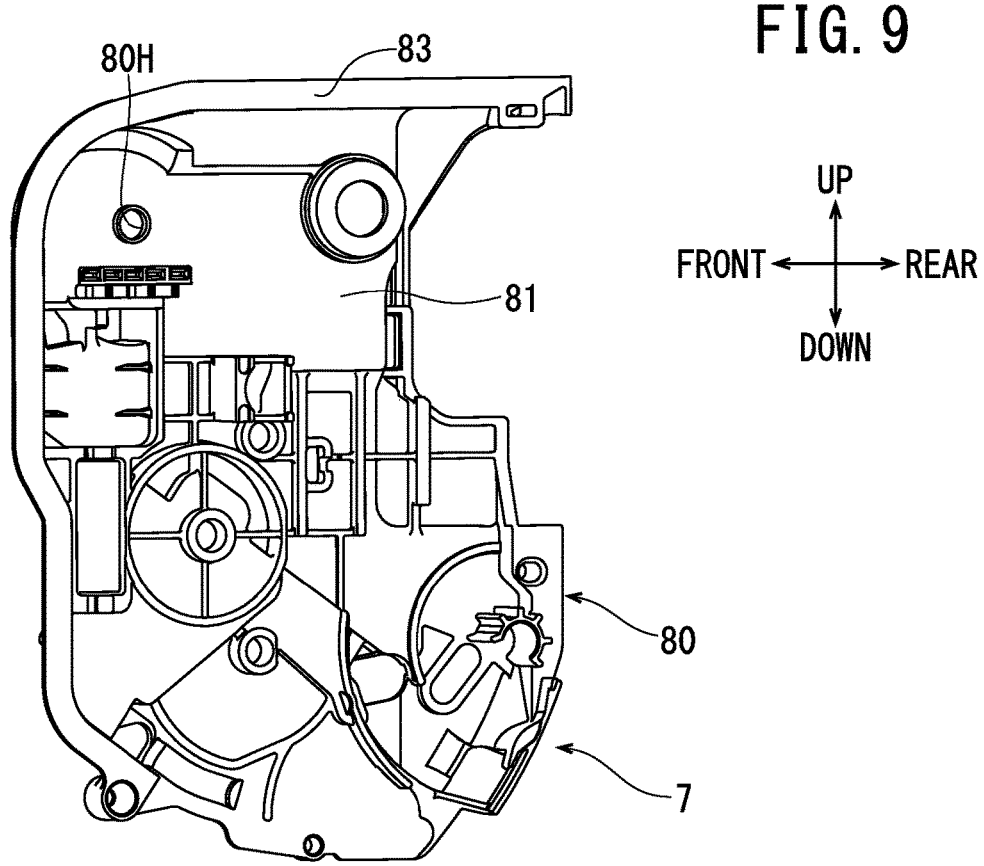
FIG. 9 is a side perspective view of a second housing of Embodiment 1.

As shown, e.g., in FIGS. 7 to 9, the actuating housing 7 includes a first housing 70 and a second housing 80, each made of resin.

As shown in FIG. 8, the first housing 70 includes a first base wall 71 and a first peripheral edge section 73 surrounding the first base wall 71.

As shown in FIG. 9, the second housing 80 includes a second base wall 81 and a second peripheral edge section 83 surrounding the second base wall 81. A connector fitting section (external connector mating part) 80C and a peripheral wall 88 as shown in FIGS. 2 to 5 are formed on the second base wall 81. Furthermore, an opening 80H as shown in FIGS. 4, 5, and 9 is formed in the second base wall 81.

As shown, e.g., in FIGS. 2 and 4, the connector fitting section 80C is recessed from a part located above and in the front on the second base wall 81 toward the vehicle exterior. Projecting ends T1A of five connection terminals T1 respectively project from the connector fitting section 80C toward the vehicle interior.

As shown, e.g., in FIGS. 4 and 9, the opening 80H is a round hole that penetrates through the second base wall 81 at a position above the connector fitting section 80C.

As shown, e.g., in FIGS. 2 and 4, the peripheral wall 88 is a cylindrical wall projecting from the second base wall 81 toward the vehicle interior and surrounding the connector fitting section 80C and the opening 80H.

A single (one-piece) blocking member (shielding element) 89 is attached to the second base wall 81 of the second housing 80 along (around) an upper portion and lateral (front and rear) portions of the peripheral wall 88. The two ends of the blocking member 89 separate (deviate) from the peripheral wall 88 below the lateral (front and rear) portions of the peripheral wall 88 and both extend downward. The blocking member 89 is a foam body that provides a blocking (shielding) function. More specifically, the blocking member 89 may be, e.g., a foam body made of closed cells, a foam body having open cells and a film formed on (sealably covering) the front surface thereof, a foam body made of semi-open cells having high water impermeability, etc. The blocking member 89 may be made of an easily compressively deformable material such as foamed polyethylene, foamed polyurethane, or foamed ethylene propylene rubber.

The second housing 80 is assembled onto (joined to) the first housing 70 by disposing the first base wall 71 opposite to the second base wall 81 and welding the first peripheral edge section 73 to the second peripheral edge section 83, whereby a housing chamber 7A (see e.g., FIG. 16) is formed in the interior of the actuating housing 7.

Figure 11:
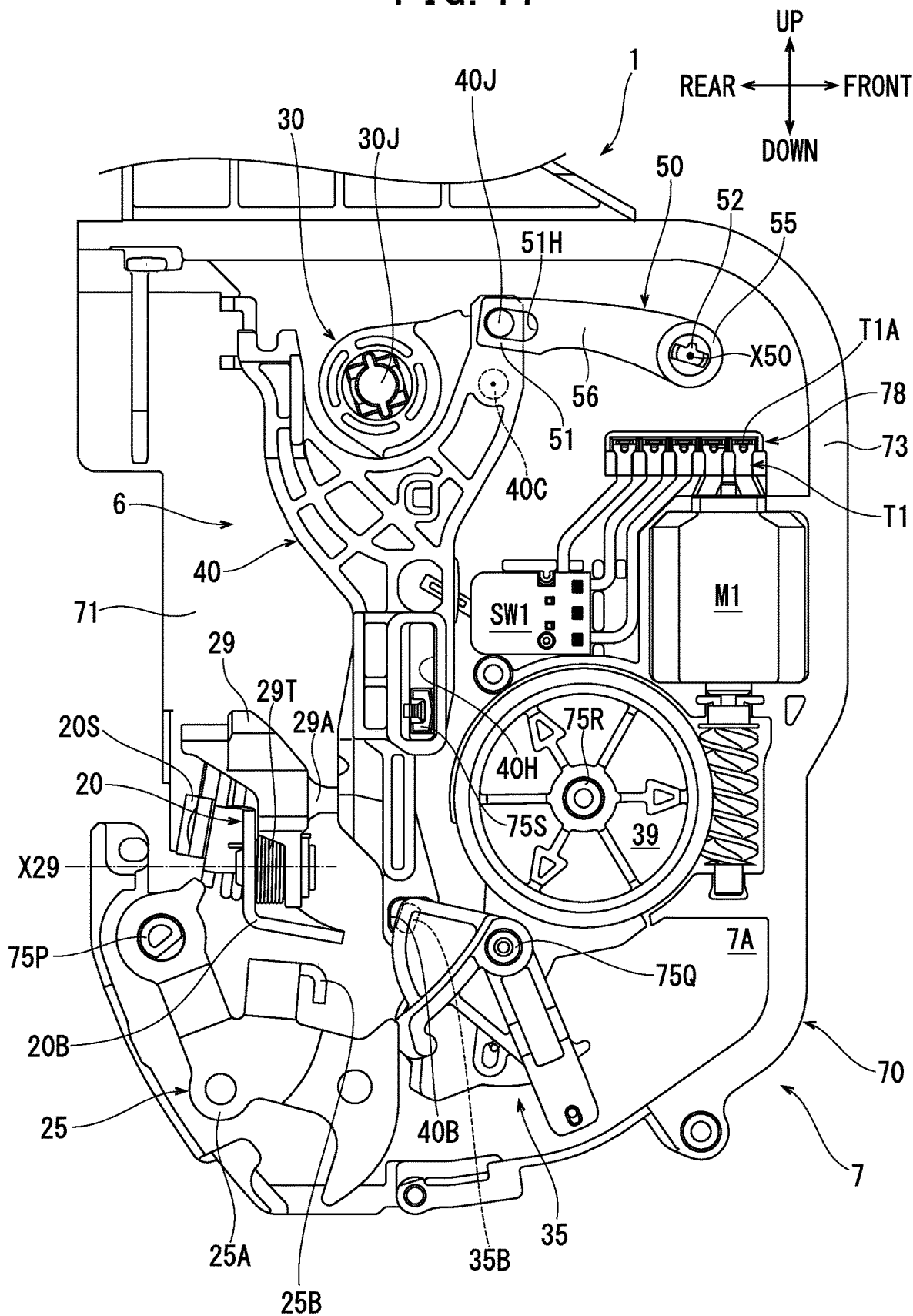
FIG. 11 is a side view of the first housing, the lock mechanism, etc. of Embodiment 1.

The lock mechanism 6, an electric motor M1, and a switch SW1 are housed in the housing chamber 7A as shown, e.g., in FIGS. 7, 8, and 11. The electric motor M1 and the switch SW1 are representative, non-limiting examples of "electronic components associated with (operably coupled to) the actuating mechanism" according to the present teachings.

Base portions of the five connection terminals T1 (i.e. portions other than the respective projecting ends T1A) are housed within the housing chamber 7A. Further, a portion of the movable member 50, which extends from a first end 51 to an intermediate portion of a transmission shaft 55, is housed within the housing chamber 7A, as will be further discussed below.

As shown in FIG. 6, the latch housing 9 includes a third housing 90 made of resin, as well as a base plate 99 and a back plate 98, which are each made from steel plate.

A fork pivot shaft 11S and a pawl pivot shaft 12S are inserted through the third housing 90. The base plate 99 is disposed behind the third housing 90. The back plate 98 is disposed in front of the third housing 90. The rear ends of the fork pivot shaft 11S and the pawl pivot shaft 12S are respectively crimped and thereby affixed to the base plate 99; the front ends of the fork pivot shaft 11S and the pawl pivot shaft 12S are respectively crimped and thereby affixed to the back plate 98, whereby a latch chamber 9A is formed in the interior of the latch housing 9. The latch mechanism 8 shown in FIGS. 2, 6, and 12 to 15 is housed in the latch chamber 9A.

After the third housing 90 is provisionally assembled (mounted) onto the first housing 70, the second housing 80 is assembled (mounted) onto the first housing 70 and the first peripheral edge section 73 of the first housing 70 and the second peripheral edge section 83 of the second housing 80 are welded, whereby the third housing 90 is joined to the first housing 70 and the second housing 80.

As shown in FIGS. 2 and 6, a plurality of fixing holes 99H and an entry opening 99A are formed in the base plate 99. A plurality of locking screws 99B (only one locking screw 99B that has a leader line is shown in FIG. 3) are inserted through the rear end face of the door 2 and further screwed into the fixing holes 99H of the base plate 99, whereby the door lock apparatus 1 is fixed between the outer panel 3 and the inner panel 4 in the interior of the door 2 with the entry opening 99A exposed on the rear end face of the door 2. When the door lock apparatus 1 moves in response to opening and closing of the door 2, a striker fixed to the vehicle frame separates from (exits) or enters the entry opening 99A.

As shown in FIGS. 3 to 5, a circular open window 4H penetrates through the inner panel 4 in the vehicle inward-outward direction. The inner diameter of the open window 4H is slightly larger than the outer diameter of the peripheral wall 88.

When the door lock apparatus 1 has been fixed between the outer panel 3 and the inner panel 4, the actuating housing 7 opposes (faces) the vehicle exterior side of the inner panel 4. The peripheral wall 88 is disposed in the open window 4H and projects through the inner panel 4. The connector fitting section 80C and the opening 80H, which are surrounded by the peripheral wall 88, open into the interior space between the inner panel 4 and the door trim 5. The open window 4H, the connector fitting section 80C, the opening 80H, an external connector E1, a wiring harness attached to the external connector E1, etc. are covered by the door trim 5.

As was noted above, FIG. 3 shows the peripheral wall 88 passing through the inner panel 4 and projecting towards the door trim 5. In this installation state, the blocking member 89 attached to the second housing 80 along a portion of the peripheral wall 88 contacts the actuating housing 7 and the inner panel 4 around the peripheral edge of the open window 4H and is compressed (deformed). As shown in FIGS. 3 to 5, the blocking member 89 covers the upper, front and rear sides of the connector fitting section 80C and the opening 80H, which are surrounded by the peripheral wall 88, in an umbrella shape (i.e. an inverted, substantially U-shape, V-shape or horseshoe shape).

Before the door trim 5 is affixed to the inner panel 4, the connector fitting section 80C and the opening 80H are open (exposed) towards the vehicle interior side. As shown in FIGS. 2 and 3, an external connector E1 is mated with the connector fitting section 80C (via the open window 4H) and is thereby connected to the respective projecting ends T1A of the five connection terminals T1. Although not shown in the figures, a wiring harness extends from the external connector E1 in the interior space between the inner panel 4 and the door trim 5 and further extends through a door hinge (not shown), which pivotably connects the door 2 to the vehicle frame, into the interior of the vehicle frame.

As shown in FIG. 6, the latch mechanism 8 includes a fork 11 and a pawl 12. The fork 11 is pivotably supported by the fork pivot shaft 11S located above the entry opening 99A. A torsion coil spring 11T is attached to the fork pivot shaft 11S. The pawl 12 is pivotably supported by the pawl pivot shaft 12S located below the entry opening 99A. A torsion coil spring 12T is attached to the pawl pivot shaft 12S.

As shown in FIGS. 12-15, the fork 11 is urged (biased) by the torsion coil spring 11T so as to pivot about the fork pivot shaft 11S in direction D11. The portion of the fork 11 located close to the entry opening 99A has (is divided into) an inner convex segment 11A and an outer convex segment 11B. When a striker S1 enters the entry opening 99A, it fits in a cutout 11C formed between the inner convex segment 11A and the outer convex segment 11B. In the state shown in FIGS. 12, 14 and 15, the fork 11 retains the striker S1 at (or near) the base (bottom) of the entry opening 99A. A latch surface 11D configured to come into contact with a stopper surface 12A, which will be explained below, is formed at (on) the distal end of the inner convex segment 11A that faces the pawl 12.

Figure 12:
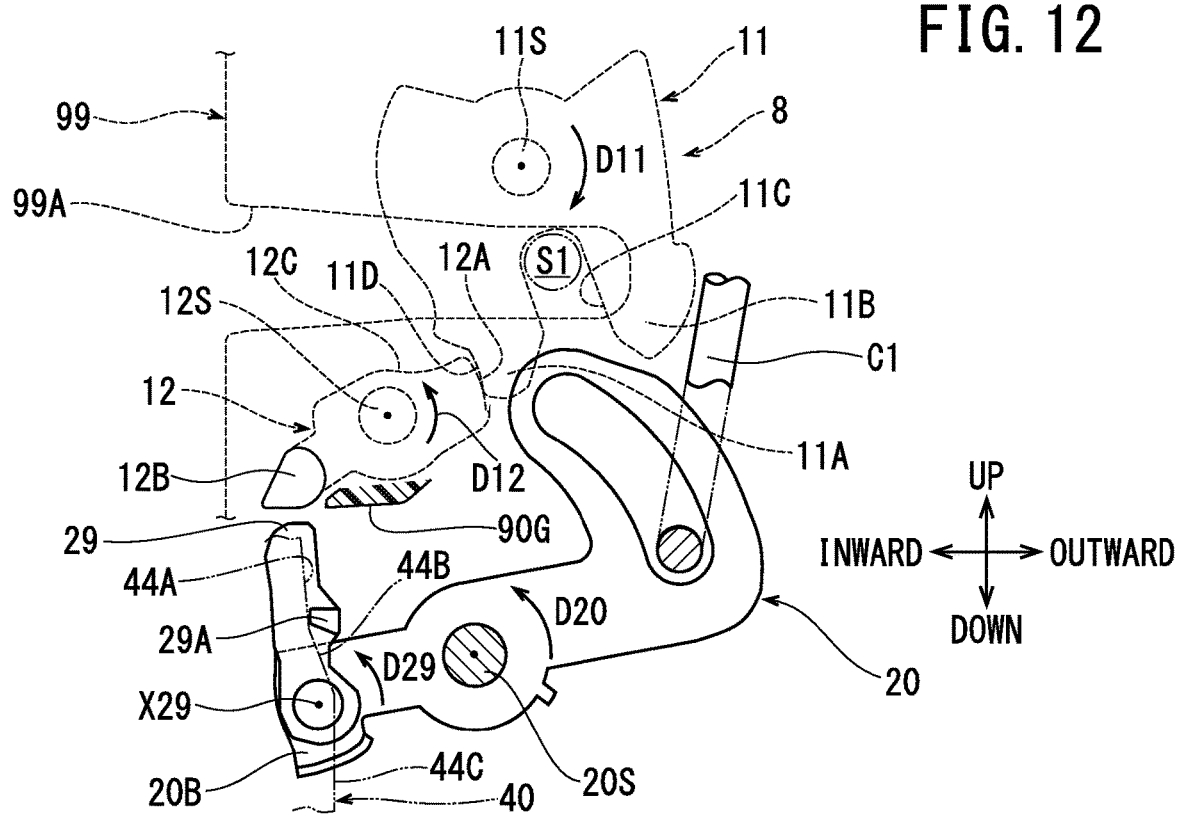
FIG. 12 is a first schematic diagram for explaining the operations of an O/S open lever, an inertial lever, a fork, and a pawl.

The pawl 12 is urged by the torsion coil spring 12T so as to pivot in direction D12 about the pawl pivot shaft 12S and holds the posture (orientation) shown in FIG. 12.

The stopper surface 12A is formed in (on) a portion of the pawl 12 that is directed towards the base (bottom) of the entry opening 99A. The stopper surface 12A is formed so as to face the latch surface 11D. An arc forming the stopper surface 12A is cut on the side that faces the fork 11. A sliding surface 12C that extends towards the pawl pivot shaft 12S is formed starting from the part (location) where the arc is cut. A contact (contacted) convex section 12B is formed on the pawl 12 on the side that is opposite of the stopper surface 12A across the pawl pivot shaft 12S. As shown in FIG. 6, the contact convex section 12B projects forward and has a columnar shape. Although not shown in the figures, the front end of the contact convex section 12B projects forward from the latch chamber 9A passing through the third housing 90 and enters the housing chamber 7A.

Figure 14:
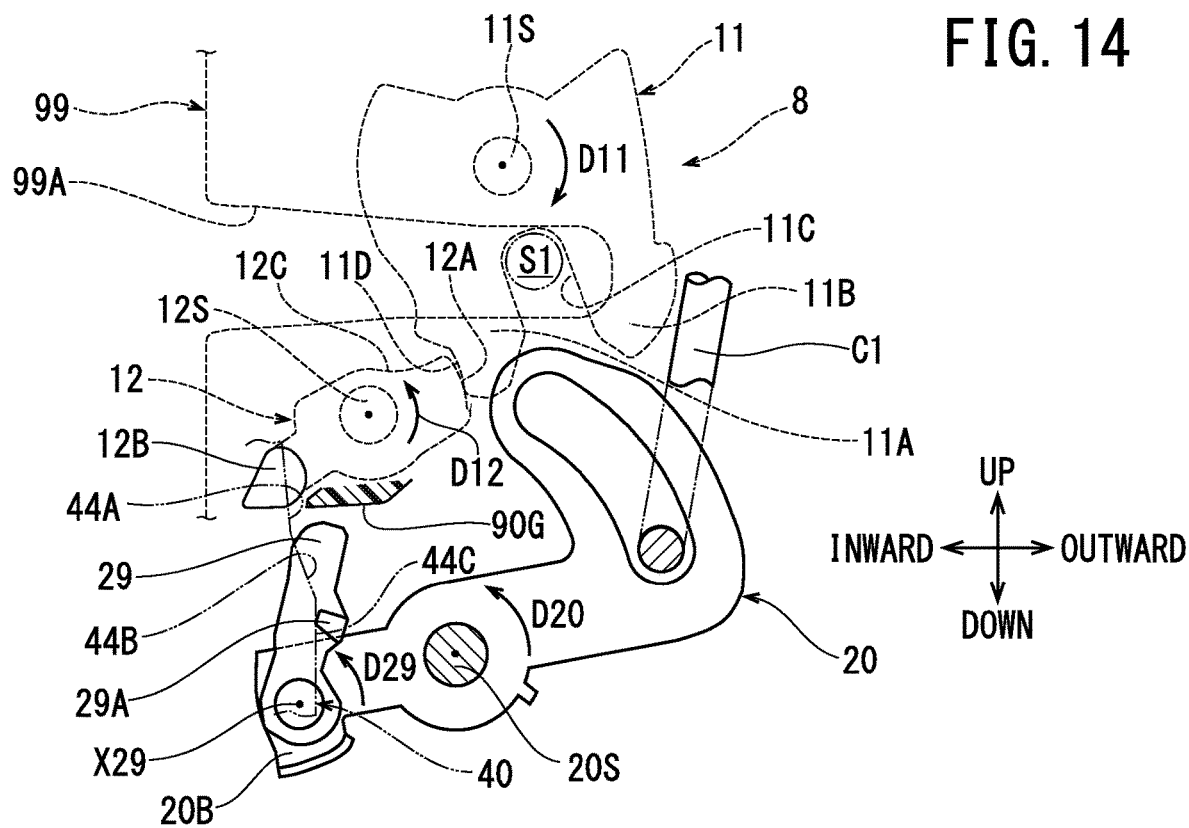
FIG. 14 is a third schematic diagram for explaining the operations of the O/S open lever, the inertial lever, the fork, and the pawl.
Figure 15:
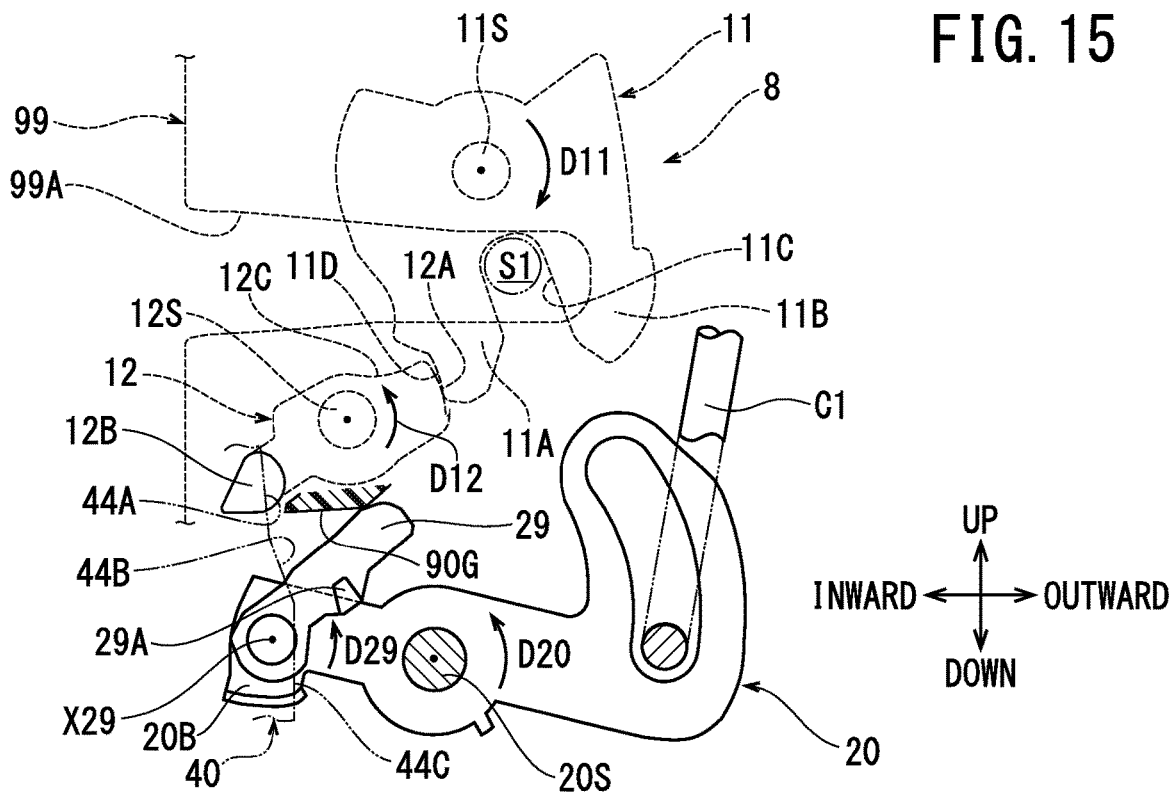
FIG. 15 is a fourth schematic diagram for explaining the operations of the O/S open lever, the inertial lever, the fork, and the pawl.

As shown in FIGS. 12, 14 and 15, when the fork 11 retains (holds) the striker S1 at (or near) the base (bottom) of the entry opening 99A, the stopper surface 12A comes into contact with the latch surface 11D of the inner convex segment 11A, whereby the pawl 12 prevents the fork 11 from pivoting in the direction D11. The position of the fork 11 shown in FIG. 12 is the latch position that holds (retains) the striker S1 in the entry opening 99A.

Figure 13:
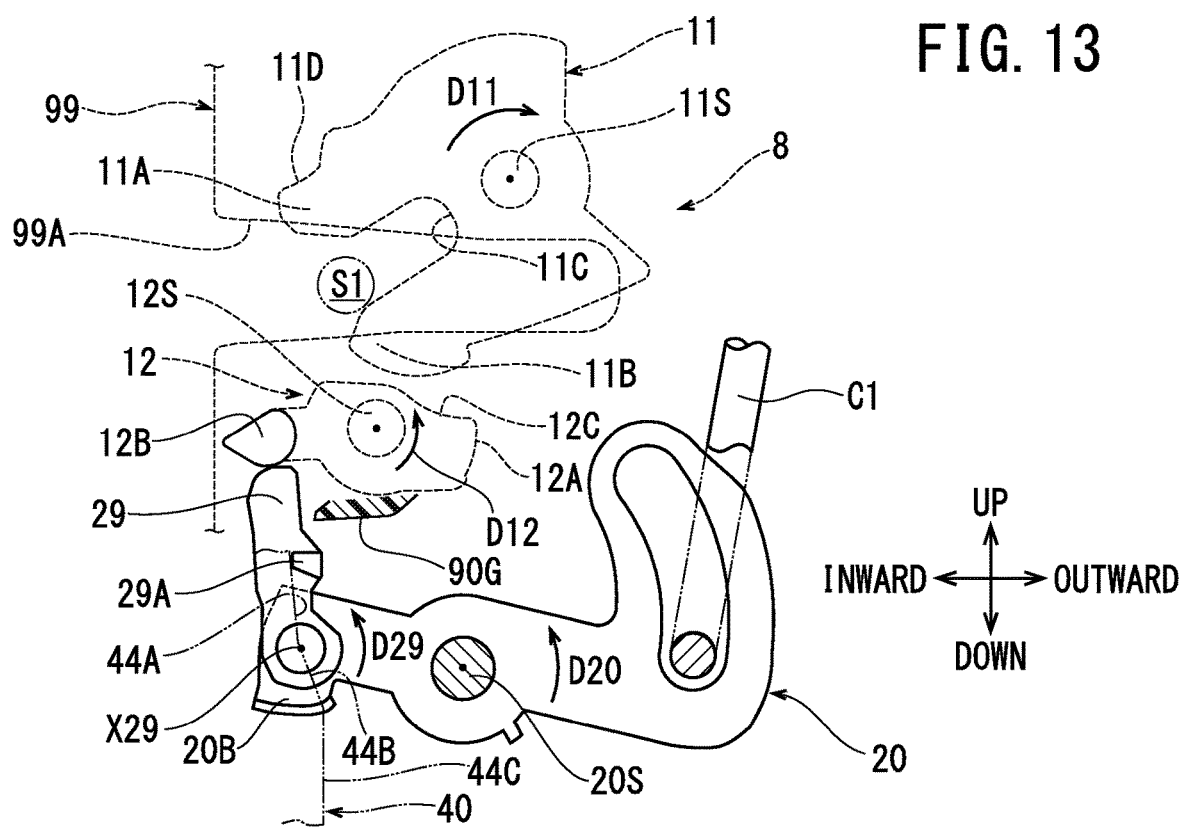
FIG. 13 is a second schematic diagram for explaining the operations of the O/S open lever, the inertial lever, the fork, and the pawl.

As shown in FIG. 13, when an inertial lever 29, which will be further explained below, comes into contact with and pushes up the contact convex section 12B of the pawl 12, the pawl 12 pivots about the pawl pivot shaft 12S in the opposite direction of the direction D12 while overcoming the urging force of the torsion coil spring 12T. At this time, since the stopper surface 12A separates from the latch surface 11D, the pawl 12 no longer blocks the pivoting movement of the fork 11. Therefore, the fork 11 pivots about the fork pivot shaft 11S in the direction D11 due to the urging force of the torsion coil spring 11T so as to displace to the unlatch position, where the striker S1 is permitted (released) to move out of (exit) the entry opening 99A.

Conversely, when the striker S1 enters the entry opening 99A, the striker S1 pushes against the outer convex segment 11B, thereby causing the fork 11 to pivot in the opposite direction of the direction D11 and to return from the unlatch position shown in FIG. 13 to the latch position shown in FIG. 12. At this time, the distal ends of the outer convex segment 11B and the inner convex segment 11A sequentially come into slide contact with the sliding surface 12C. When the inner convex segment 11A separates from the sliding surface 12C, the pawl 12 pivots in the direction D12 and returns to the original posture shown in FIG. 12. Therefore, the stopper surface 12A comes into contact with the latch surface 11D and fixes the pivoting of the fork 11 in the latch position. As a result, the latch mechanism 8 retains the door 2 closed with respect to the vehicle frame.

As shown in FIGS. 7, 8, 10, and 11, the lock mechanism 6 includes the O/S open lever 20, the I/S open lever 25, the inertial lever 29, the O/S lock lever 30, a lock lever 35, a linearly moving lock lever 40, and a worm wheel 39. It is noted that, as shown in FIG. 1, one end of the O/S open lever 20 projects to the outside (out) of the actuating housing 7.

As shown in FIGS. 7 and 8, an outside (O/S) open lever pivot shaft 20S projects rearward at the rear and lower portion of the first base wall 71 of the first housing 70.

A first shaft 75P is formed in (on) a rear and lower part of the first base wall 71 of the first housing 70. A second shaft 75Q is formed in (on) a part of the first base wall 71 that is farther frontward than the first shaft 75P. A third shaft 75R and a fourth shaft 75S are formed in or on a part located substantially in the center of the first base wall 71. The first shaft 75P, the second shaft 75Q, the third shaft 75R, and the fourth shaft 75S respectively extend toward the second base wall 81 of the second housing 80.

The O/S open lever 20 is pivotably supported by the O/S open lever pivot shaft 20S. As shown in FIG. 8, a torsion coil spring 20T is attached to the O/S open lever pivot shaft 20S. As shown in FIG. 12, the O/S open lever 20 is urged (biased) by the torsion coil spring 20T so as to pivot about the O/S open lever pivot shaft 20S in the D20 direction.

As shown in FIGS. 1 and 12, the one end of the O/S open lever 20 projects out of the actuating housing 7. The lower end of the transmission rod C1 is coupled to the one end.

As shown in FIGS. 7 and 8, the inertial lever 29 is supported by the other end 20B of the O/S open lever 20 so as to be pivotable about a pivot axis X29 extending in the front-rear direction. The inertial lever 29 is urged (biased) by a torsion coil spring 29T so as to pivot about the pivot axis X29 in the direction D29 as shown in FIG. 12.

When the exterior door handle H1 is operated (e.g., manually pulled) to open the door and the transmission rod C1 descends (is moved downward) as shown in FIG. 13, the one end of the O/S open lever 20 is pushed down. The O/S open lever 20 pivots in the opposite direction of the D20 direction and lifts the inertial lever 29.

As shown in FIGS. 7 and 8, the I/S open lever 25 is pivotably supported by the first shaft 75P. The second end of the transmission cable C4 shown in FIGS. 1 and 2 is operably coupled to one end 25A of the I/S open lever 25 that is spaced downward from the first shaft 75P. That is, the I/S open lever 25 is operably coupled to the interior door handle H4 via the transmission cable C4.

As shown in FIGS. 7 and 8, an operating part 25B is formed on a part above the one end 25A of the I/S open lever 25. The I/S open lever 25 pivots in the counterclockwise direction when the interior door handle H4 is operated (e.g., manually pulled) to open the door. Consequently, the operating part 25B pushes up the other end 20B of the O/S open lever 20 and lifts the inertial lever 29. It is briefly noted that the I/S open lever 25 has the further function (a so-called override function) that, when the door 2 is in the locked state, it acts on the lock lever 35 by only manually opening the interior door handle H4 to bring the door 2 into the unlocked state and enabling the door 2 to be opened.

As shown in FIG. 8, an O/S lock lever pivot shaft 30S projects from the first housing 70 toward the vehicle interior at an upper part of the first base wall 71.

A shaft hole (blind hole) having an inner diameter slightly larger than the outer diameter of the O/S lock lever pivot shaft 30S shown in FIG. 8 is formed in (extends into) the O/S lock lever 30. When the O/S lock lever pivot shaft 30S is inserted into the shaft hole, the O/S lock lever 30 is pivotably supported by the O/S lock lever pivot shaft 30S.

As shown in FIGS. 7 and 8, the O/S lock lever 30 includes a coupling shaft 30J and an engaging concave segment 30D. The coupling shaft 30J projects from an end face of the O/S lock lever 30 facing the vehicle interior toward the vehicle interior coaxially with the O/S lock lever pivot shaft 30S. The engaging concave segment 30D is provided at a farther forward portion of the O/S lock lever 30 than the O/S lock lever pivot shaft 30S and is recessed in the radially inward direction of the O/S lock lever pivot shaft 30S.

In Embodiment 1, a switch for detecting the position of the O/S lock lever 30 is not provided in the housing chamber 7A. Position information of the O/S lock lever 30 detected by another means is used to control locking/unlocking of the door 2 and to sense (ascertain) the state of the door lock apparatus 1. It is noted that a switch for detecting the position of the O/S lock lever 30 optionally may be provided in the housing chamber 7A.

As shown in FIG. 2, the coupling shaft 30J projects out of (beyond) the second housing 80. The link lever C2C is affixed to the distal end of the coupling shaft 30J so as to rotate therewith.

Although not shown in the figures, the O/S lock lever pivots in the counterclockwise direction when the key cylinder H2 is turned to lock it. On the other hand, the O/S lock lever 30 pivots in the clockwise direction when the key cylinder H2 is turned to unlock it.

Figure 10:
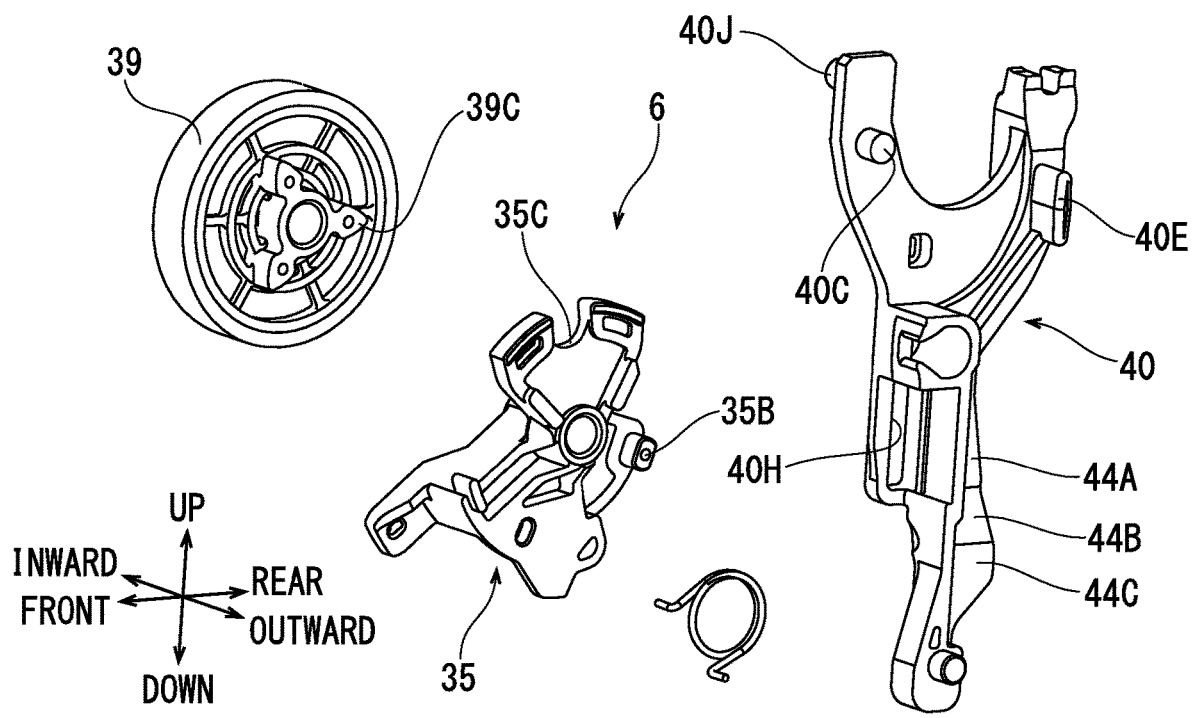
FIG. 10 is an exploded perspective view of a worm wheel, a lock lever, and a linearly moving lock lever of Embodiment 1.

As shown in FIGS. 7 and 8, the lock lever 35 is pivotably supported by the second shaft 75Q. As shown in FIGS. 8 and 10, a cam 35C is formed in (on) an upper part of the lock lever 35. An operating part 35B projects toward the vehicle exterior from the surface of the lock lever 35 that faces the vehicle exterior.

As shown in FIGS. 7 and 8, the worm wheel 39 is rotatably (turnably) supported by the third shaft 75R. The electric motor M1 is disposed in the housing chamber 7A at a farther upward and forward position than the worm wheel 39. A terminal retaining section 78 that retains (holds) the five connection terminals T1 is provided above the electric motor M1 in the housing chamber 7A. Two of the five connection terminals T1 are connected to the electric motor M1. These two connection terminals T1 supply electric power (current) from an external power supply to the electric motor M1 during the control (operation) of the locking/unlocking of the door 2. The worm wheel 39 meshes with a worm fixed to the rotary shaft of the electric motor M1.

As shown in FIG. 10, a cam section 39C of the worm wheel 39 is engageable with the cam 35C of the lock lever 35 and is formed on the surface of the worm wheel 39 that faces the vehicle exterior. When the electric motor M1 is actuated to perform an unlocking operation or a locking operation by using, e.g., a remote control key, fob, etc., the worm wheel 39 is driven by the electric motor M1 to rotate in the clockwise direction or in the counterclockwise direction. The worm wheel 39 pivots the lock lever 35 from the position shown in FIG. 7 to the position shown in FIG. 11 (and vice versa) owing to the meshing of the cam section 39C and the cam 35C.

As shown in FIGS. 7, 8, 10, and 11, the fourth shaft 75S is inserted through an elongated hole 40H that extends in the up-down direction, whereby the linearly moving lock lever 40 is supported by the fourth shaft 75S so as to be linearly movable. The fourth shaft 75S has a substantially "C" shaped cross-section. The linearly moving lock lever 40 has a substantial "Y" shape that forks above the elongated hole 40H.

As shown in FIGS. 8 and 10, a linearly moving convex section 40E projects toward the vehicle exterior from a rearward and upward portion of the fork of the linearly moving lock lever 40. As shown in FIG. 8, a linear-movement guide groove 71E is formed in the first base wall 71 of the first housing 70 and extends in the up-down direction at a position that is upward and rearward of the fourth shaft 75S. The linearly moving convex section 40E is guided by the linear-movement guide groove 71E, whereby the linearly moving lock lever 40 is linearly movable in the up-down direction without inclining (tilting).

As shown in FIG. 7, the rearward-extending switch lever of the switch SW1 is configured to engage with a part above the elongated hole 40H of the linearly moving lock lever 40. Three of the five connection terminals T1 are connected to the switch SW1. The linearly moving lock lever 40 turns ON (connects) one contact within the switch SW1 when the linearly moving lock lever 40 is located at the position shown in FIG. 7. When the linearly moving lock lever 40 is moved upward from the position shown in FIG. 7 to the position shown in FIG. 11, it turns ON (connects) another contact within the switch SW1. ON/OFF signals of the two contacts within the switch SW1 are transmitted to a controller provided in the vehicle frame via the three connection terminals T1 and the external connector E1 and are used for controlling the locking/unlocking of the door 2 and for sensing the state of the door lock apparatus 1.

As shown in FIGS. 7 and 8, a concave section 40B is formed in the lower end of the linearly moving lock lever 40.

As shown in FIGS. 7 and 11, the operating part 35B of the lock lever 35 is engaged in the concave section 40B.

As shown in FIG. 10, an engaging convex part 40C projects toward the vehicle exterior at the distal end of a part of the linearly moving lock lever 40 that branches forward and upward. As shown in FIGS. 7 and 11, the engaging convex part 40C projects into the engaging concave segment 30D of the O/S lock lever 30.

As shown in FIGS. 7, 8, and 10, a columnar coupling convex section 40J projects toward the vehicle interior at the distal end of the part of the linearly moving lock lever 40 that branches forward and upward and above the engaging convex part 40C.

As shown in FIGS. 2 to 5, 7, 8, 11, and 16, the movable member 50 is an integrally molded product and includes the first end 51 located in the housing chamber 7A, the second end 52 located out of the actuating housing 7 and on the vehicle interior side, and the transmission shaft 55 between the first end 51 and the second end 52. The transmission shaft 55 passes through the opening 80H in the second base wall 81 in the assembled state of the door lock apparatus 1.

Figure 16:
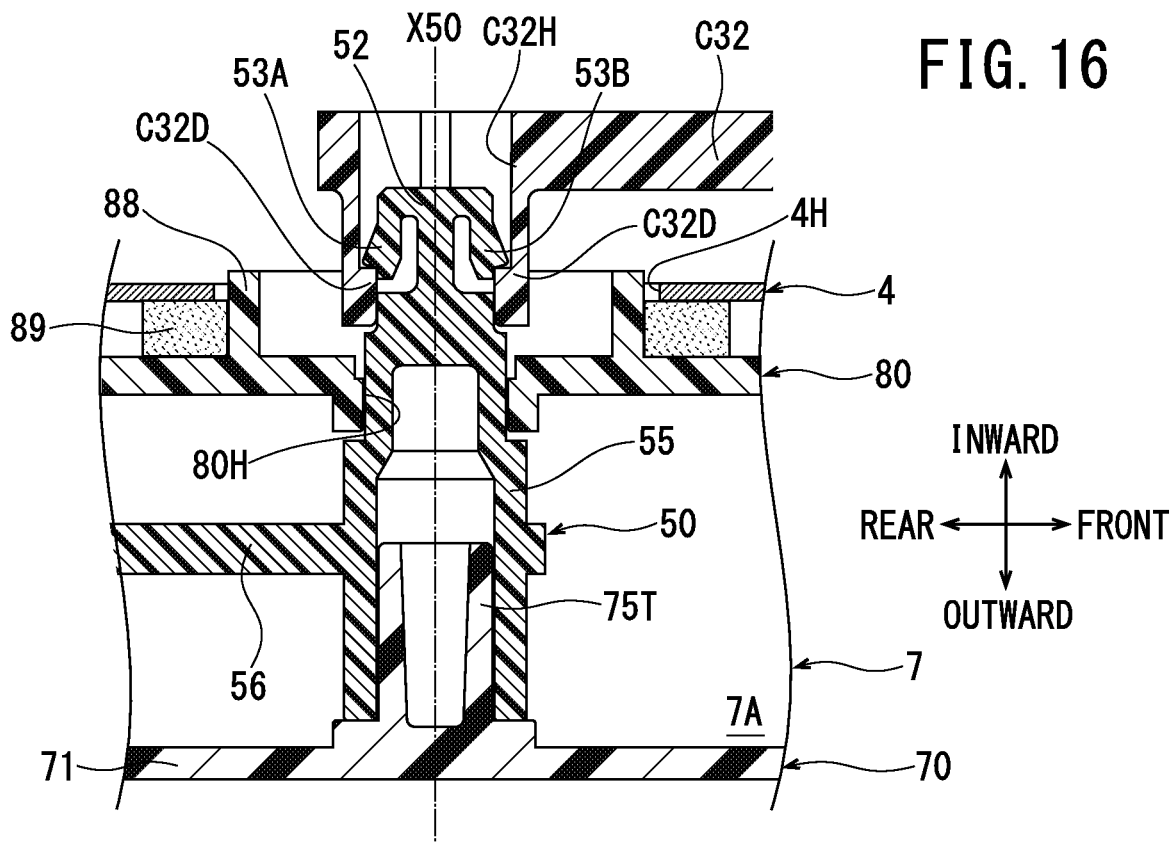
FIG. 16 is a partial sectional view showing a cross-section along line A-A in FIG. 4.

As shown in FIG. 8, a fifth shaft 75T projects from the first base wall 71 of the first housing 70 in the vehicle inward direction at a location above the terminal retaining section 78. The fifth shaft 75T is a cylindrical body having a rotation axis X50 that extends at least substantially in parallel with the thickness (depth) direction of the inner panel 4, i.e., in the vehicle inward-outward direction. As shown in FIG. 16, the fifth shaft 75T extends toward the opening 80H formed in the second base wall 81 of the second housing 80.

The portion of the transmission shaft 55 that is located in the housing chamber 7A has a cylindrical shape. By inserting the fifth shaft 75T into a hollow interior (blind hole) of the transmission shaft 55, the transmission shaft 55 is rotatably supported about the rotation axis X50.

As shown, e.g., in FIGS. 7 and 8, an arm 56 of the movable member 50 extends radially outward from the rotation axis X50 on the outer circumference side of the portion of the transmission shaft 55 that is located in the housing chamber 7A. The first end 51 is the distal end of the arm 56 that is spaced rearward of the rotation axis X50. An elongated hole 51H penetrates through the first end 51 in the vehicle inward-outward direction. In the housing chamber 7A, the coupling convex section 40J of the linearly moving lock lever 40 is inserted through the elongated hole 51H, whereby the first end 51 of the movable member 50 is coupled to the linearly moving lock lever 40.

As shown in FIG. 16, the transmission shaft 55 projects outward of the actuating housing 7 by passing through the opening 80H. The portion of the transmission shaft 55 that projects from (out of) the actuating housing 7 is surrounded by the peripheral wall 88 and is covered on its upper, front and rear sides by the blocking member 89 having the umbrella shape (e.g., inverted U-shape).

Still referring to FIG. 16, the second end 52 is the distal end of the transmission shaft 55 that projects from (out of) the actuating housing 7. The second end 52 includes locking pieces 53A and 53B. The locking pieces 53A and 53B are connected to the distal end of the second end 52 at positions separated (spaced apart) from each other across the rotation axis X50 and extend toward the vehicle exterior. The locking pieces 53A and 53B are elastically deformable (compressible) in the radial inward direction of the rotation axis X50.

A step C32D is formed at the vehicle-outward end of the inner wall surface of the shaft hole C32H of the link lever C32. The step C32D defines a narrow gap (hole) that permits passage of the locking pieces 53A and 53B into the shaft hole C32H when they are elastically deformed (compressed) in the radial inward direction of the rotation axis X50.

As shown in FIG. 4, the second end 52 has a substantially T shape when viewed in the direction of the rotation axis X50. The shaft hole C32H of the link lever C32 also has a substantially T shape matching the second end 52 when viewed in the direction of the rotation axis X50.

When the door lock apparatus 1 is fixed between the outer panel 3 and the inner panel 4 and the connector fitting section 80C and the opening 80H are open towards the vehicle interior as shown in FIGS. 3 to 5, the link lever C32 of the link member C3 can be placed on the vehicle interior side of the inner panel 4 and operably coupled to the second end 52 of the movable member 50 that projects through the inner panel 4, as shown in FIG. 16.

At this time, because the second end 52 is inserted into the shaft hole C32H, the link lever C32 is coupled to the second end 52 in a rotationally blocked state. In this state, the coupling hole C32J of the link lever C32 is located on the opposite side across the rotation axis X50 with respect to the elongated hole 51H of the first end 51 of the movable member 50, as shown, e.g., in FIG. 4.

At this time, after the locking pieces 53A and 53B have passed through the step C32D of the shaft hole C32H by being elastically compressed, they are elastically restored to their original shape and come into contact with the step C32D as shown in FIG. 16. As a result, the locking pieces 53A and 53B detachably lock the link lever C32 on the second end 52.

It is noted that a tool can be inserted into the shaft hole C32H of the link lever C32 to elastically deform the locking pieces 53A and 53B in the radial inward direction of the rotation axis X50, whereby the second end 52 can then be detached (withdrawn) from the shaft hole C32H of the link lever C32.

As was explained below, the linearly moving lock lever 40 linearly moves in response to (i) a locking operation or an unlocking operation requested by a remote control key (fob), (ii) a manual locking operation performed on the interior door lock knob H3, and (iii) a locking operation or an unlocking operation performed on the key cylinder H2 by turning a key.

When the lock lever 35 pivots from the position shown in FIG. 7 to the position shown in FIG. 11 in response to a locking operation being requested by the remote control key or the like, the displacement of the lock lever 35 is transmitted to the linearly moving lock lever 40 via the concave section 40B and the operating part 35B. The linearly moving lock lever 40 is pushed up from the position shown in FIG. 7 to the position shown in FIG. 11.

At this time, the upward displacement of the linearly moving lock lever 40 is transmitted to the movable member 50 via the coupling convex section 40J and the elongated hole 51H. The movable member 50 rotates from the position shown in FIGS. 4 and 7 to the position shown in FIGS. 5 and 11. The link lever C32 of the link member C3 rotates integrally with the movable member 50 and, as shown in FIG. 5, lowers the interior door lock knob H3 via the link rod C31. As a result, the interior door lock knob H3 is completely submerged in the guide hole 5H and indicates that the door 2 is in the locked state. The position of the movable member 50 shown in FIGS. 5 and 11 is a second position corresponding to the locked state of the door 2.

When the lock lever 35 pivots from the position shown in FIG. 11 to the position shown in FIG. 7 in response to an unlocking operation being requested by the remote control key or the like, the displacement of the lock lever 35 is transmitted to the linearly moving lock lever 40 via the concave section 40B and the operating part 35B. The linearly moving lock lever 40 is lowered from the position shown in FIG. 11 to the position shown in FIG. 7.

At this time, the downward displacement of the linearly moving lock lever 40 is transmitted to the movable member 50 via the coupling convex section 40J and the elongated hole 51H. The movable member 50 rotates from the position shown in FIGS. 5 and 11 to the position shown in FIGS. 4 and 7. The link lever C32 of the link member C3 rotates integrally with the movable member 50 and, as shown in FIG. 4, lifts the interior door lock knob H3 via the link rod C31. As a result, the interior door lock knob H3 projects from (above) the guide hole 5H and is exposed on the vehicle interior side of the door 2, thereby indicating that the door 2 is in the unlocked state. The position of the movable member 50 shown in FIGS. 4 and 7 is a first position corresponding to the unlocked state of the door 2.

When the movable member 50 pivots from the position shown in FIGS. 4 and 7 to the position shown in FIGS. 5 and 11 in response to the occupant manually pushing the interior door lock knob H3 from the position shown in FIG. 4 to the position shown in FIG. 5, the displacement of the movable member 50 is transmitted to the linearly moving lock lever 40 via the first end 51 and the coupling convex section 40J. The linearly moving lock lever 40 is lifted from the position shown in FIG. 7 to the position shown in FIG. 11.

Although not shown in the figures, when the O/S lock lever 30 pivots in the counterclockwise direction in response to a locking operation performed on the key cylinder H2 by turning a key, the displacement of the O/S lock lever 30 is transmitted to the linearly moving lock lever 40 via the engaging concave segment 30D and the engaging convex part 40C. The linearly moving lock lever 40 is lifted from the position shown in FIG. 7 to the position shown in FIG. 11.

At this time as well, the upward displacement of the linearly moving lock lever 40 is transmitted to the interior door lock knob H3 via the movable member 50 and the link member C3. As a result, as shown in FIG. 5, the interior door lock knob H3 is completely submerged in the guide hole 5H and indicates that the door 2 is in the locked state.

When the O/S lock lever 30 pivots in the clockwise direction in response to the unlocking operation performed on the key cylinder H2, the displacement of the O/S lock lever 30 is transmitted to the linearly moving lock lever 40 via the engaging concave segment 30D and the engaging convex part 40C. The linearly moving lock lever 40 is lowered from the position shown in FIG. 11 to the position shown in FIG. 7.

At this time as well, the downward displacement of the linearly moving lock lever 40 is transmitted to the interior door lock knob H3 via the movable member 50 and the link member C3. As a result, as shown in FIG. 4, the interior door lock knob H3 projects from the guide hole 5H and is exposed on the vehicle interior side of the door 2, thereby indicating that the door 2 is in the unlocked state.

As shown in FIGS. 10 and 12 to 15, a first surface 44A is formed on the linearly moving lock lever 40 rearward of the elongated hole 40H; a second surface 44B and a third surface 44C are formed on the linearly moving lock lever 40 downward of the first surface 44A. The first surface 44A, the second surface 44B, and the third surface 44C are formed on the surface of the linearly moving lock lever 40 that faces the vehicle exterior. The first surface 44A and the third surface 44C are each flat surfaces that extend in the up-down direction. The first surface 44A is displaced (shifted) more towards the vehicle interior than the third surface 44C. The second surface 44B is an inclined surface that connects the lower end of the first surface 44A with the upper end of the third surface 44C.

As shown in FIGS. 7, 8, and 11 to 15, a projection 29A projects forward from the front surface of the inertial lever 29. The projection 29A comes into slide contact with the first surface 44A, the second surface 44B, and the third surface 44C in response to linear movement of the linearly moving lock lever 40.

As shown in FIGS. 12 to 15, an inertial lever guide surface 90G is formed on the third housing 90 on the side of the housing chamber 7A. The inertial lever guide surface 90G is a downward flat surface located farther towards the vehicle exterior than the contact convex section 12B of the pawl 12. The inertial lever guide surface 90G extends toward the vehicle exterior so as to separate (be spaced) from the contact convex section 12B.

The position of the linearly moving lock lever 40 shown in FIGS. 12 and 13 is the same as the position of the linearly moving lock lever 40 shown in FIG. 7. The position of the linearly moving lock lever 40 shown in FIGS. 14 and 15 is the same as the position of the linearly moving lock lever 40 shown in FIG. 11.

When the linearly moving lock lever 40 is located at the position shown in FIGS. 12 and 13, the projection 29A of the inertial lever 29 comes into contact with the first surface 44A of the linearly moving lock lever 40, whereby the inertial lever 29 is retained in an upward position. In the state shown in FIG. 13, if the inertial lever 29 rises, the inertial lever 29 comes into contact with the contact convex section 12B and causes the pawl 12 to open the fork 11 so that the striker S1 can be released.

When the linearly moving lock lever 40 is displaced to the position shown in FIGS. 14 and 15, the projection 29A of the inertial lever 29 comes into slide contact with the second surface 44B of the linearly moving lock lever 40 and then comes into contact with the third surface 44C, whereby the inertial lever 29 is held inclined toward the vehicle exterior. In the state shown in FIG. 15, if the inertial lever 29 rises, the inertial lever 29 comes into contact with the inertial lever guide surface 90G, the inertial lever 29 separates from the contact convex section 12B, and the pawl 12 continues to fix (retain) the fork 11.

The position of the inertial lever 29 shown in FIGS. 12 and 13 is an unlock position where the inertial lever 29 is capable of acting on the pawl 12. The position of the inertial lever 29 shown in FIGS. 14 and 15 is a lock position where the inertial lever 29 is incapable of acting on the pawl 12.

In the position shown in FIGS. 11, 14, and 15, the third surface 44C comes into contact with the projection 29A and the linearly moving lock lever 40 retains the inertial lever 29 in the lock position. The position of the linearly moving lock lever 40 shown in FIGS. 11, 14, and 15 is a locked position.

In the position shown in FIGS. 7, 12, and 13, the third surface 44C separates (is spaced) from the projection 29A and the linearly moving lock lever 40 does not retain (hold) the inertial lever 29 in the lock position shown in FIGS. 14 and 15. The inertial lever 29 brings the projection 29A into contact with the first surface 44A due to the urging force of the torsion coil spring 29T. When an inertial force (impact, shock or impulse) caused by a side collision acts on the inertial lever 29, the inertial lever 29 causes the projection 29A to separate from the first surface 44A and the inertial lever 29 inclines (tilts) toward the vehicle exterior. The position of the linearly moving lock lever 40 shown in FIGS. 7, 12, and 13 is an unlocked position.

In the unlocked position shown, e.g., in FIGS. 7 and 12, the linearly moving lock lever 40 causes the inertial lever 29 to stand upright and enables the fork 11 located in the latch position shown in FIG. 12 to be displaced to the unlatch position shown in FIG. 13. In the locked position shown, e.g., in FIGS. and 14, the linearly moving lock lever 40 inclines the inertial lever 29 and disables the fork 11 located in the latch position shown in FIG. 12 or 14 from being displaced to the unlatch position shown in FIG. 13.

The above-described representative door lock apparatus 1, which has such a configuration, can hold the door 2 closed with respect to the vehicle frame, open the door 2, and lock and unlock the door 2 in the closed state in response to different types of operation performed by an occupant of the vehicle.

Operation and Effects

In the door lock apparatus 1 of above-described Embodiment 1, the connector fitting section 80C and the opening 80H are exposed towards the vehicle interior through a single open window 4H in the inner panel 4 as shown in FIGS. 3 to 5 and 16. Therefore, it is not necessary to provide separate open windows (openings) for the connector fitting section 80C and for the second end 52 of the movable member 50. Consequently, the door lock apparatus 1 makes it possible to easily carry out, via the single open window 4H, the mating of the external connector E1 in the connector fitting section 80C and the coupling the link lever C32 of the link member C3 to the second end 52 of the movable member 50.

Furthermore, by placing a single (one-piece) blocking member 89 in contact with the actuating housing 7 and the inner panel 4 around at least the upper portion of the peripheral edge of the open window 4H, it is possible to easily and reliably block dust, water, burglary tools (so called "slim jims" or "lockout tools"), etc. from entering the single open window 4H.

Therefore, the door lock apparatus 1 of above-described Embodiment 1 makes it possible to simplify the assembly process and/or provides an improved blocking function.

In the door lock apparatus 1 of above-described Embodiment 1, a water-proofing treatment for blocking the ingress of water, dust, etc. through the single open window 4H into the interior space between the inner panel 4 and the door trim 5 can be easily implemented by using the blocking member 89. Therefore, any water, etc. that enters (seeps) through the gap between the door window and the outer panel 3 (more specifically, a rubber weatherstrip attached to the outer panel 3) can be prevented from entering (seeping) into both of the actuating housing 7 (via the connector fitting section 80C and/or the opening 80H) and the interior space between the door trim 5 and the inner panel 4 (via the open window 4H). As a result, improved durability of the door lock apparatus 1 and the vehicle can be realized.

Moreover, if a thin tool (e.g., the above-mentioned "slim jim" or lockout tool) is inserted through the gap between the door window and the outer panel 3 in order to manipulate the second end 52 of the movable member 50, the tool will be blocked by the blocking member 89 and/or the peripheral wall 88. Therefore, improved anti-theft properties (protection) can be realized.

Furthermore, when the door trim 5 is detached from the inner panel 4, the link member C3 can be easily detached from the second end 52 of the movable member 50. Therefore, maintenance/repair work on the door lock apparatus 1 can be performed more easily.

In the door lock apparatus 1 of above-described Embodiment 1, the peripheral wall 88, which surrounds the connector fitting section 80C and the opening 80H and projects through the inner panel 4, is formed on the actuating housing 7, as shown in FIGS. 2 to 5 and 16. Because the peripheral wall 88 is disposed in the open window 4H, the peripheral wall 88 can perform a guide function that aligns the open window 4H with the connector fitting section 80C and the opening 80H. Deviation of the blocking member 89 from its ideal position can be prevented because the blocking member 89 is disposed along the peripheral wall 88. As a result, further simplification of the assembly process can be realized.

Furthermore, because the peripheral wall 88 and the open window 4H are circular, the assembly process is simplified. Therefore, the peripheral wall 88 can be easily disposed (inserted) in the open window 4H.

In the door lock apparatus 1 of above-described Embodiment 1, the blocking member 89 is formed of a foam body having the blocking/shielding function and is attached to the actuating housing 7. Consequently, when the latch housing 9 and the actuating housing 7 are fixed to the door 2, the blocking member 89 comes into contact with the inner panel 4 while being compressively deformed. Therefore, the blocking member 89 can tightly/resiliently contact the actuating housing 7 and the inner panel 4 without a gap therebetween. As a result, foreign matter, such as dust, water, a tool, etc. can be reliably blocked from entering (passing through) the open window 4H. Moreover, labor and time for disposing the blocking member 89 between the actuating housing 7 and the inner panel 4 later can be saved, which further simplifies the assembly process.

Furthermore, in the door lock apparatus 1 of above-described Embodiment 1, the transmission shaft 55 between the first end 51 and the second end 52 of the movable member 50 is configured to passing through the opening 80H in the second housing 80 and rotate around the rotation axis X50. At least the upper portion of the transmission shaft 55 projecting from (outward of) the actuating housing 7 is covered by the blocking member 89 at the upper side. Such a configuration makes it possible to reduce the size of the opening 80H through which the transmission shaft 55 passes. Therefore, because the open window 4H can be reduced in size, it is possible to more reliably prevent (block) foreign matter from reaching the gap between the opening 80H and the transmission shaft 55 by using the blocking member 89.

In the door lock apparatus 1 of above-described Embodiment 1, by elastically deforming the locking pieces 53A and 53B formed at the second end 52 of the movable member 50 (see FIG. 16), the work for coupling the link lever C32 of the link member C3 to the second end 52 of the movable member 50 and/or for detaching the link lever C32 from the second end 52 can be easily performed.

Embodiment 2

Figure 17:
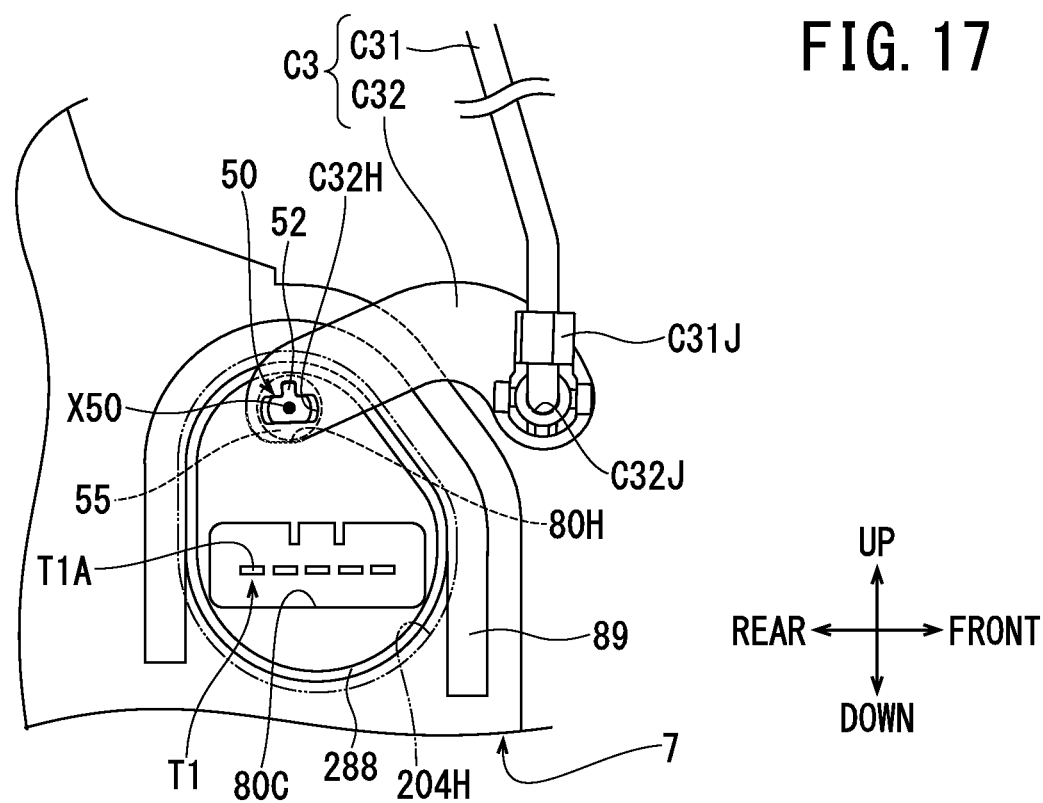
FIG. 17 is a partial side view of a vehicle door lock apparatus according to Embodiment 2.

FIG. 17 shows a door lock apparatus according to Embodiment 2 of the present teachings, in which a peripheral wall 288 bulges farther upward and rearward than the circular peripheral wall 88 of the door lock apparatus 1 according to Embodiment 1. The shape (contour) of the open window 204H of the inner panel 4 matches (follows) the shape (contour) of the peripheral wall 288 and is slightly larger than the peripheral wall 288. Because the open window 204H bulges upwardly as compared to the open window 4 of Embodiment 1, it is possible to shift the positions of the opening 80H, the rotation axis X50, and the transmission shaft 55 and the second end 52 of the movable member 50 farther upward than in Embodiment 1. The blocking member 89 extends along at least an upper portion and lateral (front and rear) portions of the peripheral wall 288. Therefore, the blocking member 89 covers the upper, front and rear sides of the connector fitting section 80C and the opening 80H, which are surrounded by the peripheral wall 288, in an umbrella shape.

The other components in Embodiment 2 are the same as the components in Embodiment 1. Therefore, the same components as the components in Embodiment 1 are denoted by the same reference numerals and signs and explanation of the remaining components is omitted.

The door lock apparatus of Embodiment 2 also enables the assembly process to be simplified. Furthermore, the connector fitting section 80C and the opening 80H can be spaced farther apart in this door lock apparatus. Therefore, design flexibility of the movable member 50 can be increased. In addition, an increase in the size of the connector fitting section 80C can be easily realized, if necessary, e.g., to accommodate an increased number and/or size of the electronic components in the housing chamber 7A.

Embodiment 3

Figure 18:
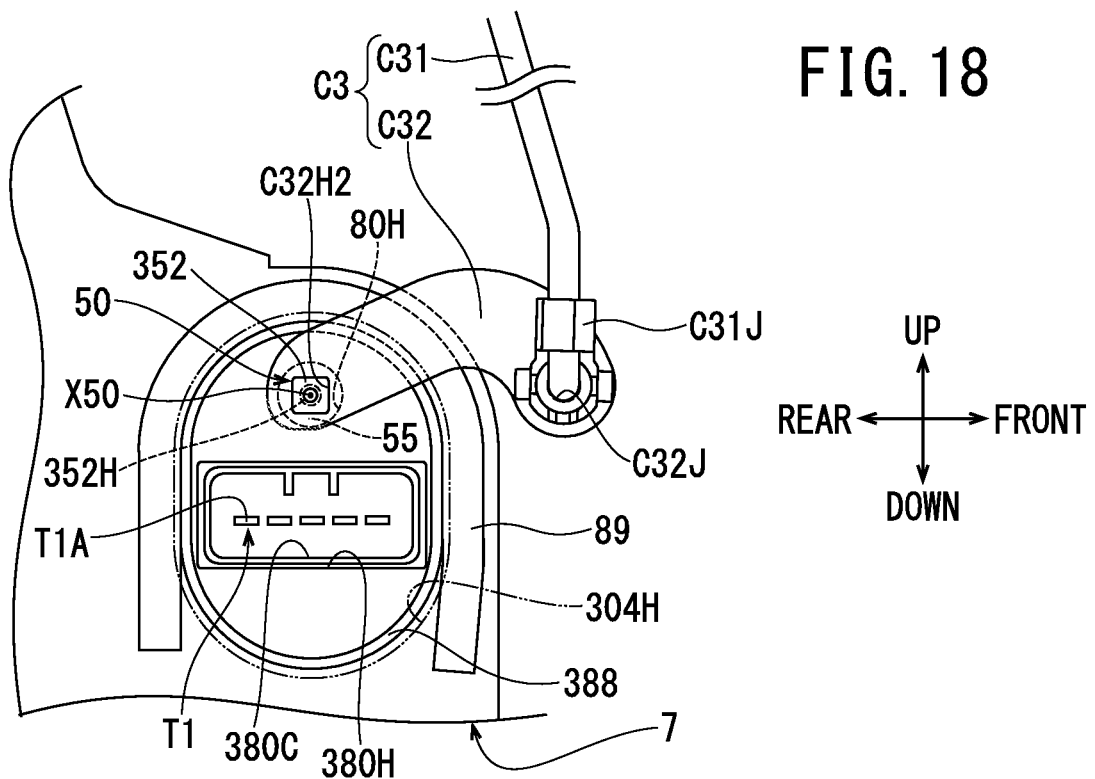
FIG. 18 is a partial side view of a vehicle door lock apparatus according to Embodiment 3.

FIG. 18 shows a door lock apparatus according to Embodiment 3 of the present teachings, in which an elliptical peripheral wall 388 that is elongated in the up-down direction is adopted instead of the circular peripheral wall 88 of the door lock apparatus 1 according to Embodiment 1. The shape (contour) of the open window 304H of the inner panel 4 matches (follows) the shape (contour) of a peripheral wall 388 and is slightly larger than the peripheral wall 388. For the same reason as Embodiment 2, it is possible to shift the positions of the opening 80H, the rotation axis X50, and the transmission shaft 55 and the second end 52 of the movable member 50 farther upward than in Embodiment 1. The blocking member 89 again extends along at least an upper portion and lateral (front and rear) portions of the peripheral wall 388. Therefore, the blocking member 89 covers the upper, front and rear sides of the connector fitting section 80C and the opening 80H, which are surrounded by the peripheral wall 388, in an umbrella shape.

In this door lock apparatus, a square second end 352 is adopted instead of the substantially T-shaped second end 52 of the movable member 50. A square shaft hole C32H2 matching the second end 352 is adopted instead of the substantially T-shaped shaft hole C32H of the link lever C32. When the second end 352 is inserted into the shaft hole C32H2, the link lever C32 is coupled to the second end 352 in a rotational blocked state. A screw hole 352H is formed in the distal end of the second end 352. By screwing a not-shown locking screw into the screw hole 352H, the link lever C32 is prevented from coming off the second end 352.

Further, in this door lock apparatus, a connector fitting section 380C separate from the first housing 70 and the second housing 80 is adopted instead of the connector fitting section 80C integrally formed in (on) the second housing 80. The connector fitting section 380C is exposed to the outside of the actuating housing 7 via a connector fitting section opening 380H formed in a part surrounded by the peripheral wall 388 on the second base wall 81 of the second housing 80. Although not shown in FIG. 18, a base of the connector fitting section 380C is fixed to at least one of the first housing 70 and the second housing 80.

The other components in Embodiment 3 are the same as the components in Embodiment 1. Therefore, the same components as the components in Embodiment 1 are denoted by the same reference numerals and signs and explanation of the remaining components is omitted.

The door lock apparatus of Embodiment 3 also enables the assembly process to be simplified, similar to Embodiments 1 and 2. Furthermore, this door lock apparatus increases the design flexibility of the connector fitting section 380C because the connector fitting section 380C is separate from the first housing 70 and the second housing 80.

Embodiment 4

Figure 19:
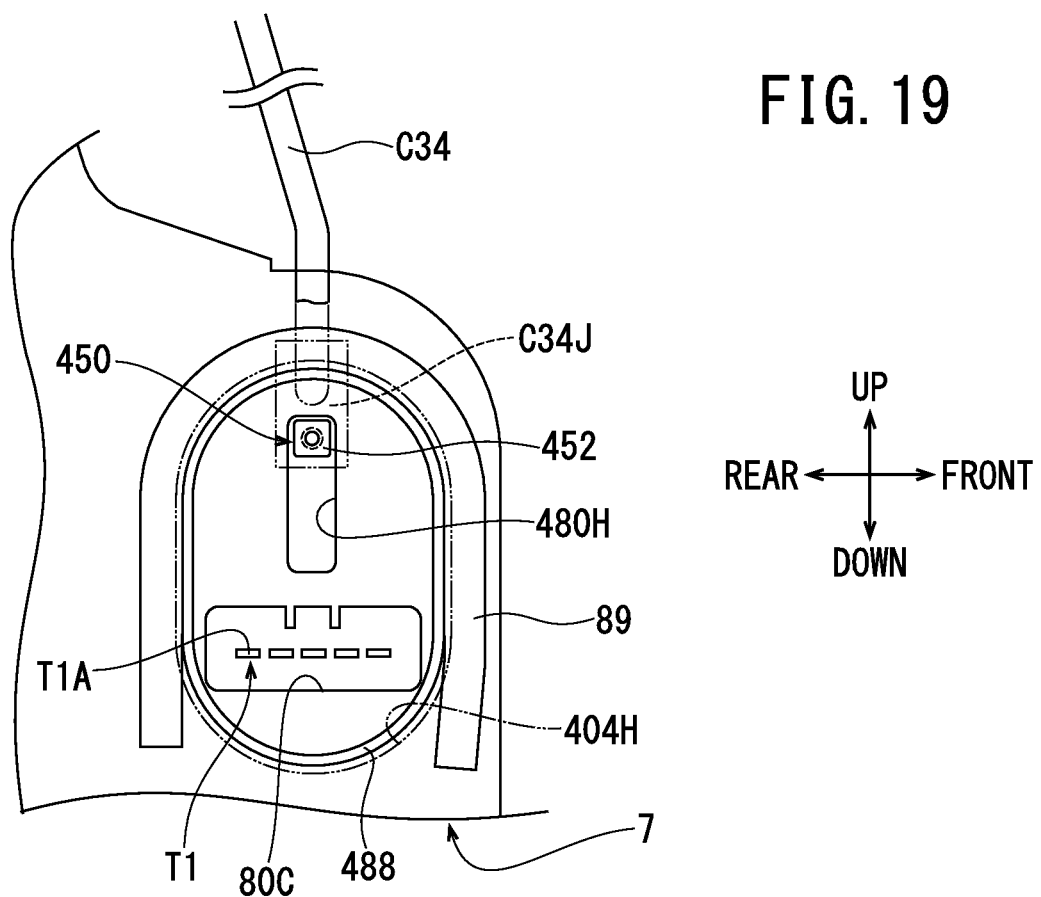
FIG. 19 is a partial side view of a vehicle door lock apparatus according to Embodiment 4.

FIG. 19 shows a door lock apparatus according to Embodiment 4 of the present teachings, in which an elliptical peripheral wall 488 that is elongated in the up-down direction is adopted instead of the circular peripheral wall 88 of the door lock apparatus 1 according to Embodiment 1. The peripheral wall 488 is longer in the up-down direction than the peripheral wall 388 according to Embodiment 3. The shape (contour) of the open window 404H of the inner panel 4 matches or follows the shape (contour) of the peripheral wall 488 and is slightly larger than the peripheral wall 488.

In this door lock apparatus, a rectangular opening 480H that is elongated in the up-down direction is adopted instead of the circular opening 80H according to Embodiment 1. The blocking member 89 extends along at least an upper portion and lateral (front and rear) portions of the peripheral wall 488. Therefore, the blocking member 89 covers the upper, front and rear sides of the connector fitting section 80C and the opening 480H, which are surrounded by the peripheral wall 488, in an umbrella shape.

Figure 20:
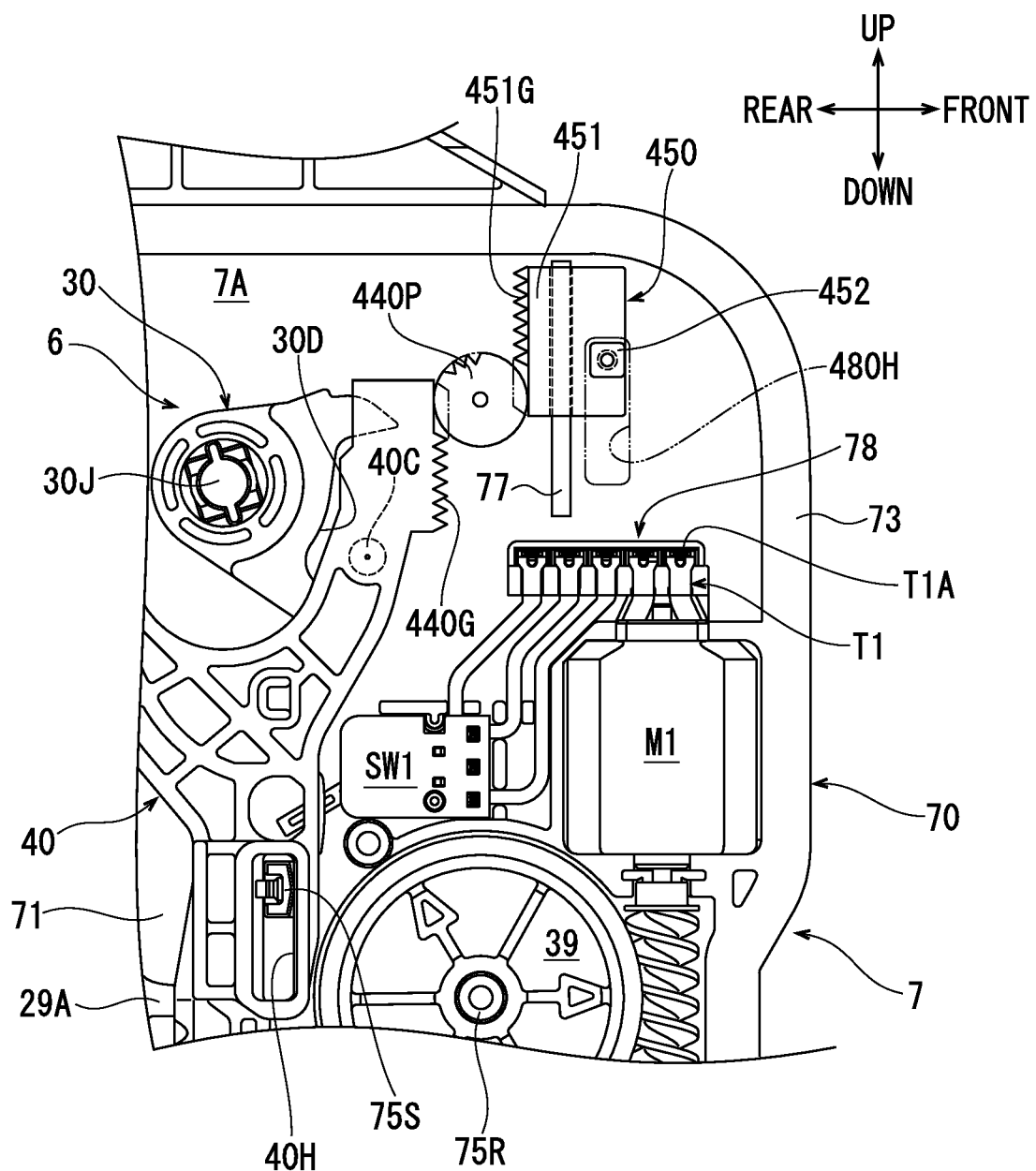
FIG. 20 relates to the vehicle door lock apparatus according to Embodiment 4 and is a partial side view of a first housing, a lock mechanism, etc.

Further, as shown in FIG. 20, this door lock apparatus includes a rack gear 440G instead of the coupling convex section 40J formed in the linearly moving lock lever 40 according to Embodiment 1. The rack gear 440G is formed on an upper portion of the forward fork portion of the linearly moving lock lever 40. A plurality of gear teeth form the rack gear 440G and extend side by side in the up-down direction with the gear teeth projecting forward. A pinion gear 440P meshes with the rack gear 440G and is disposed in the housing chamber 7A.

In this door lock apparatus, a movable member 450, which differs from the movable member 50 according to Embodiment 1, is supported in a linearly movable manner in the up-down direction by a guide rail 77 formed on the first base wall 71 of the first housing 70 in the housing chamber 7A. The rear end edge of the movable member 450 is a first end 451. A rack gear 451G is formed at the first end 451. A plurality of gear teeth form the rack gear 451G and extend side by side in the up-down direction with the gear teeth projecting rearward. The rack gear 451G meshes with the pinion gear 440P, whereby the first end 451 of the movable member 450 is operably coupled to the linearly moving lock lever 40.

As shown in FIGS. 19 and 20, a second end 452 is a square pillar projecting from the front end edge of the movable member 450 toward the vehicle interior. The second end 452 is integral with the first end 451. The second end 452 passes through the opening 480H and projects out of the actuating housing 7.

As shown in FIG. 19, the lower end of a link member C34 is coupled to the second end 452 via a coupling supporting member C34J. Although not shown in FIG. 19 or 20, the upper end of the link member C34 is fixed to the interior door lock knob H3. It is noted that the same locking piece(s) as the locking pieces 53A and 53B according to Embodiment 1 may be provided at the second end 452 and the lower end of the link member C34 or the coupling supporting member C34J may be detachably locked by the locking piece(s) through elastic deformation.

When the linearly moving lock lever 40 linearly moves upward from an unlocked position shown in FIG. 20 and is displaced to a locked position, the movable member 450 linearly moves downward and lowers the interior door lock knob H3 via the link member C34. When the linearly moving lock lever 40 linearly moves downward from the locked position and is displaced to the unlocked position shown in FIG. 20, the movable member 450 linearly moves upward and pushes up the interior door lock knob H3 via the link member C34. When the movable member 450 linearly moves downward in response to a locking operation performed by an occupant manually pushing down the interior door lock knob H3, the linearly moving lock lever 40 linearly moves upward from the unlocked position shown in FIG. 20 and is displaced to the locked position.

In the door lock apparatus according to Embodiment 4 having such a configuration, simplification of the assembly process can be realized similar to the door lock apparatus 1 according to Embodiments 1 to 3.

The present invention is explained above in an exemplary and detailed manner with reference to Embodiments 1 to 4. However, the present invention is not limited to Embodiments 1 to 4 explained above. It goes without saying that the present invention can be changed as appropriate and applied in a range not departing from the spirit or gist of the present invention.

For example and without limitation, in Embodiments 1 to 4, the connector fitting sections 80C and 380C are a female type and the external connector E1 is a male type. However, the connector fitting sections 80C and 380C and the external connector E1 may be the opposite types.

In Embodiments 1 to 4, the door lock apparatus is configured to permit an occupant to perform the locking operation by manually pushing down the interior door lock knob H3. However, the present invention is not limited to such a configuration. For example, alternate configurations of the present teachings may include, instead of the interior door lock knob H3, e.g., an indicator (e.g., a display) that merely displays the unlocked state or the locked state of the door 2. In another alternate configuration of the present teachings, the upper end of the interior door lock knob H3 may project above the door 2 in the locked state so as to be exposed to the vehicle interior. In such an embodiment, the occupant may unlock the door 2 by pinching and pulling up the exposed portion of the interior door lock knob H3.

In another alternate configuration of the present teachings, the blocking member 89 according to Embodiments 1 to 4 may be formed in an annular shape. Specifically, the blocking member 89 according to Embodiment 1 may annularly extend along the peripheral wall 88 and entirely surround the connector fitting section 80C and the opening 80H.

The electronic components associated with (operably coupled to) the actuating mechanism are not limited to the switch SW1 and the electric motor M1 according to Embodiments 1 to 4. For example, a switch that detects the position of the fork 11 or the pawl 12 of the latch mechanism 8 according to Embodiment 1 and the like can also be included in "the electronic components associated with (operably coupled to) the actuating mechanism".

The present teachings are usable in a variety of vehicles such as, e.g., an automobile, a bus, or a commercial vehicle (e.g., a truck).

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved vehicle door lock apparatuses and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. A vehicle door lock apparatus comprising:
a housing fixed to a vehicle door and having a connector fitting section configured to mate with an external connector;
an actuating mechanism disposed in the housing and configured to lock and unlock the vehicle door;
at least one electronic component disposed in the housing and associated with the actuating mechanism;
a plurality of connection terminals electrically connected to the at least one electric component, the connection terminals respectively having projecting ends that project from the connector fitting section and mate with the external connector; and
a movable member coupled to the actuating mechanism and displaceable from a first position corresponding to an unlocked state of the actuating mechanism to a second position corresponding to a locked state of the actuating mechanism, and vice versa,
wherein the vehicle door includes an outer panel, an inner panel disposed on a vehicle interior side of the outer panel and affixed to the outer panel, and a door trim disposed on the vehicle interior side of the inner panel and affixed to the inner panel,
the housing is affixed to the vehicle door between the outer panel and the inner panel,
an open window is defined in the inner panel, the connector fitting section being disposed in the open window such that the connection terminals face towards the vehicle interior side,
a link member is disposed on the vehicle interior side of the inner panel,
the movable member includes a first end operably coupled to the actuating mechanism in the housing and a second end integral with the first end, the link member being operably coupled to the second end, the second end of the movable member projects out of the housing through an opening formed in the housing and also extends through the open window, and a single blocking member having a substantially umbrella shape is disposed between and in contact with the housing and the inner panel around at least an upper portion of a peripheral edge of the open window, the single blocking member covering at least an upper side of the connector fitting section and the opening formed in the housing.

2. The vehicle door lock apparatus according to claim 1, wherein:

a peripheral wall is defined on the housing and projects through the open window toward the door trim, and the peripheral wall surrounds the connector fitting section and the opening formed in the housing.

3. The vehicle door lock apparatus according to claim 2, wherein the peripheral wall and the open window are both circular.

4. The vehicle door lock apparatus according to claim 3, wherein the blocking member is a foam body having a blocking function and is attached to the housing.

5. The vehicle door lock apparatus according to claim 4, wherein:

the movable member includes a transmission shaft that passes through the opening formed in the housing, the transmission shaft being rotatable around a rotation axis that extends at least substantially in parallel with a thickness direction of the inner panel, and at least an upper side of the transmission shaft is covered by the blocking member in a direction perpendicular to the thickness direction of the inner panel.

6. The vehicle door lock apparatus according to claim 5, wherein the second end includes a locking piece that is elastically deformable to detachably lock the link member on the second end of the movable member.

7. The vehicle door lock apparatus according to claim 1, wherein the blocking member is a foam body having a blocking function and is attached to the housing.

8. The vehicle door lock apparatus according to claim 1, wherein:

the movable member includes a transmission shaft that passes through the opening formed in the housing, the transmission shaft being rotatable around a rotation axis that extends at least substantially in parallel with a thickness direction of the inner panel, and at least an upper side of the transmission shaft is covered by the blocking member in a direction perpendicular to the thickness direction of the inner panel.

9. The vehicle door lock apparatus according to claim 1, wherein the second end includes a locking piece that is elastically deformable to detachably lock the link member on the second end of the movable member.

10. A vehicle door comprising:

an outer panel;

an inner panel disposed on a vehicle interior side of the outer panel and affixed to the outer panel, an open window being defined in the inner panel;

a door trim disposed on the vehicle interior side of the inner panel and affixed to the inner panel; and a vehicle door lock comprising:

a housing affixed between the outer panel and the inner panel and having a connector fitting section configured to mate with an external connector;

an actuating mechanism disposed in the housing and configured to lock and unlock the vehicle door relative to a vehicle frame;

at least one electronic component disposed in the housing and associated with the actuating mechanism;

a plurality of connection terminals electrically connected to the at least one electric component, the connection terminals respectively having projecting ends that project from the connector fitting section for mating with the external connector; and a movable member coupled to the actuating mechanism and displaceable from a first position corresponding to an unlocked state of the actuating mechanism to a second position corresponding to a locked state of the actuating mechanism, and vice versa, wherein:

the connector fitting section is disposed in the open window of the inner panel such that the connection terminals face towards the vehicle interior side, a link member is disposed on the vehicle interior side of the inner panel, the movable member includes a first end operably coupled to the actuating mechanism in the housing and a second end integral with the first end, the link member being operably coupled to the second end, the second end of the movable member projects out of the housing through an opening formed in the housing and also extends through the open window of the inner panel, and a single blocking member having a substantially umbrella shape is disposed between and in contact with the housing and the inner panel around at least an upper portion of a peripheral edge of the open window of the inner panel, the single blocking member covering at least an upper side of the connector fitting section and the opening formed in the housing.

11. The vehicle door according to claim 10, wherein:

a peripheral wall is defined on the housing and projects through the open window toward the door trim, and the peripheral wall surrounds the connector fitting section and the opening formed in the housing.

12. The vehicle door according to claim 11, wherein the peripheral wall and the open window are both circular.

13. The vehicle door according to claim 10, wherein the blocking member is a foam piece configured to block water and lockout tools, the foam piece being attached to the housing.

14. The vehicle door according to claim 10, wherein:

the movable member includes a transmission shaft that passes through the opening formed in the housing, the transmission shaft is rotatable around a rotation axis that extends at least substantially in parallel with a thickness direction of the inner panel, and at least an upper side of the transmission shaft is covered by the blocking member in a direction perpendicular to the thickness direction of the inner panel.

15. The vehicle door according to claim 10, wherein the second end includes a locking piece that is elastically deformable to detachably lock the link member on the second end of the movable member.

16. A vehicle lock comprising:

a housing configured to be affixed between an outer panel and an inner panel of a vehicle door, the housing having a connector mating part configured to mate with an external connector;

an actuating mechanism disposed in the housing and configured to lock and unlock the vehicle door relative to a vehicle frame;
at least one electronic component disposed in the housing and operably coupled to the actuating mechanism;
a plurality of connection terminals electrically connected to the at least one electric component, each of the connection terminals having an end that projects from the connector mating part for mating with the external connector; and
a movable member coupled to the actuating mechanism and displaceable from a first position corresponding to an unlocked state of the actuating mechanism to a second position corresponding to a locked state of the actuating mechanism, and vice versa, wherein:

the connector mating part is disposed on the housing so as to extend into an open window of the inner panel such that the ends of the connection terminals face towards the vehicle interior side, the movable member includes a first end operably coupled to the actuating mechanism in the housing and a second end integral with the first end, the second end of the movable member projects out of the housing through an opening formed in the housing so as to extend through the open window of the inner panel, a link member is operably coupled to the second end of the movable member and is configured to be disposed on the vehicle interior side of the inner panel, a single blocking piece has a substantially inverted U-shape in side view, the single blocking piece contacts the housing and is arranged so as to extend around at least an upper portion of a peripheral edge of the open window of the inner panel when the lock is installed in the vehicle door, and the single blocking piece covers at least an upper side of the connector mating part and the opening formed in the housing.

17. The vehicle lock according to claim 16, wherein:
a peripheral wall is defined on the housing and is configured to project through the open window toward a door trim of the vehicle door, and
the peripheral wall surrounds the connector mating part and the opening formed in the housing.

18. The vehicle lock according to claim 17, wherein the peripheral wall and the open window are both circular.

19. The vehicle lock according to claim 16, wherein the single blocking piece is composed of foam configured to block water and lockout tools, the foam being directly attached to the housing.

20. The vehicle lock according to claim 16, wherein:
the movable member includes a transmission shaft that passes through the opening formed in the housing,
the transmission shaft is rotatable around a rotation axis that extends at least substantially in parallel with a thickness direction of the inner panel when the lock is installed in the vehicle door, and
at least an upper side of the transmission shaft is covered by the blocking piece in a direction perpendicular to the thickness direction of the inner panel when the lock is installed in the vehicle door.

* * * * *